| (12) | United States Patent | (10) Patent No.: | US 12,404,857 B2 |
|---|---|---|---|
| | Thomas et al. | (45) Date of Patent: | Sep. 2, 2025 |

(54) COOLING SLEEVE FOR USE WITH A FLUID END

(71) Applicant: Kerr Machine Co., Sulphur, OK (US)

(72) Inventors: Micheal Cole Thomas, Azle, TX (US); Christopher Todd Barnett, Stratford, OK (US); Nicholas Son, Davis, OK (US); John Keith, Ardmore, OK (US); Kelcy Jake Foster, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 18/960,118

(22) Filed: Nov. 26, 2024

(65) Prior Publication Data

US 2025/0172139 A1 May 29, 2025

Related U.S. Application Data

(60) Provisional application No. 63/602,912, filed on Nov. 27, 2023.

(51) Int. Cl.
- *F04B 53/16* (2006.01)
- *F04B 53/08* (2006.01)
- *F16J 15/18* (2006.01)

(52) U.S. Cl.
CPC ............ *F04B 53/164* (2013.01); *F04B 53/08* (2013.01); *F16J 15/182* (2013.01)

(58) Field of Classification Search
CPC ...................................................... F16J 15/182
See application file for complete search history.

(56) References Cited

U.S. PATENT DOCUMENTS

| 677,137 | A | | 6/1901 | Leavitt | |
|---|---|---|---|---|---|
| 1,602,193 | A | * | 10/1926 | Garber | F04B 53/128 |
| | | | | | 417/525 |
| 1,873,267 | A | * | 8/1932 | Bigelow | F16J 15/26 |
| | | | | | 277/516 |
| 2,771,846 | A | | 11/1956 | Horton et al. | |
| 2,828,696 | A | | 4/1958 | Wright | |
| 3,062,198 | A | | 11/1962 | Richardson | |
| 3,114,326 | A | * | 12/1963 | Yaindl | F04B 53/164 |
| | | | | | 62/50.7 |
| 3,181,473 | A | | 5/1965 | Duron | |
| 3,288,473 | A | * | 11/1966 | Hinds | F16J 15/182 |
| | | | | | 277/515 |
| 3,309,013 | A | | 3/1967 | Bauer | |
| 3,370,545 | A | | 2/1968 | Waibel | |
| 3,508,849 | A | | 4/1970 | Weber | |

(Continued)

FOREIGN PATENT DOCUMENTS

| CN | 105756880 A | 7/2016 |
|---|---|---|
| CN | 108843531 A | 11/2018 |

(Continued)

*Primary Examiner* — Charles G Freay

(74) *Attorney, Agent, or Firm* — Tomlinson McKinstry, P.C.

(57) ABSTRACT

A fluid end section which cools plunger packing during operation. The fluid end section uses a cooling sleeve that surrounds a portion of a fluid end housing and a stuffing box. A plunger packing is situated within the stuffing box. A cooling fluid may be circulated within a passage formed between the cooling sleeve and stuffing box so that it continuously cools components of the fluid end section during operation.

29 Claims, 29 Drawing Sheets

(56) References Cited

U.S. PATENT DOCUMENTS

| | | |
|---|---|---|
| 3,528,613 A | 9/1970 | Berlyn |
| 3,531,052 A | 9/1970 | Berlyn |
| 3,652,098 A | 3/1972 | Kawazu |
| 3,702,624 A | 11/1972 | Fries |
| 3,746,483 A | 7/1973 | Hindel |
| 3,777,779 A | 12/1973 | Scwaller |
| 4,078,574 A | 3/1978 | Kosarzecki |
| 4,174,194 A | 11/1979 | Hammelmann |
| 4,412,792 A | 11/1983 | LaBorde |
| 4,551,077 A | 11/1985 | Pacht |
| 4,616,983 A | 10/1986 | Hanafi |
| 4,878,815 A | 11/1989 | Stachowiak |
| 4,960,039 A | 10/1990 | Robertson |
| 5,037,276 A | 8/1991 | Tremoulet |
| 5,059,101 A | 10/1991 | Valavaara |
| 5,064,354 A | 11/1991 | Robertson et al. |
| 5,127,807 A | 7/1992 | Eslinger |
| 5,230,363 A | 7/1993 | Winn |
| 5,253,987 A | 10/1993 | Harrison |
| 5,302,087 A | 4/1994 | Pacht |
| 5,331,736 A | 7/1994 | Suggs |
| 5,382,057 A | 1/1995 | Richter |
| 5,605,449 A | 2/1997 | Reed |
| 5,636,975 A | 6/1997 | Tiffany et al. |
| 5,709,514 A | 1/1998 | Suggs |
| 5,924,853 A | 7/1999 | Pacht |
| 6,231,323 B1 | 5/2001 | Jezek |
| 6,234,490 B1 | 5/2001 | Champlin |
| 6,341,950 B1 | 1/2002 | Schuller et al. |
| 7,354,046 B2 | 4/2008 | Ramsay |
| 8,047,820 B2 | 11/2011 | Merrick |
| 8,240,634 B2 | 8/2012 | Jarchau et al. |
| 8,366,114 B1 * | 2/2013 | Gruner ............... F28F 9/00 277/510 |
| 9,188,122 B1 | 11/2015 | Reed |
| 9,328,745 B2 | 5/2016 | Bartlok |
| 9,371,919 B2 | 6/2016 | Forrest et al. |
| 9,670,922 B2 | 6/2017 | Pacht |
| 9,739,382 B2 | 8/2017 | Laird et al. |
| 10,184,470 B2 | 1/2019 | Barnett |
| D916,240 S | 4/2021 | Nowell et al. |
| 11,859,601 B2 | 1/2024 | Son et al. |
| 12,000,257 B2 | 6/2024 | Foster et al. |
| 2008/0093361 A1 | 4/2008 | Kennedy |
| 2009/0194951 A1 * | 8/2009 | Cohen Zada Vaizman ............... F16J 15/406 277/513 |
| 2011/0036408 A1 | 2/2011 | Desai |
| 2012/0272764 A1 | 11/2012 | Pendleton |
| 2013/0045123 A1 | 2/2013 | Roman et al. |
| 2013/0263932 A1 | 10/2013 | Baxter |
| 2014/0127062 A1 | 5/2014 | Buckley et al. |
| 2014/0348677 A1 | 11/2014 | Moeller |
| 2015/0071803 A1 | 3/2015 | Huang |
| 2015/0147194 A1 | 5/2015 | Foote |
| 2016/0090980 A1 | 3/2016 | Howard et al. |
| 2017/0204852 A1 | 7/2017 | Barnett et al. |
| 2018/0306150 A1 | 10/2018 | Stecklein et al. |
| 2019/0017503 A1 | 1/2019 | Foster et al. |
| 2019/0032685 A1 | 1/2019 | Foster et al. |
| 2019/0063427 A1 | 2/2019 | Nowell et al. |
| 2019/0128104 A1 | 5/2019 | Graham et al. |
| 2019/0242373 A1 | 8/2019 | Wernig |
| 2019/0360483 A1 | 11/2019 | Nowell |
| 2020/0182240 A1 | 6/2020 | Nowell et al. |
| 2021/0148349 A1 | 5/2021 | Nowell et al. |
| 2022/0243724 A1 | 8/2022 | Li |
| 2022/0260161 A1 | 8/2022 | Nowell |
| 2022/0412346 A1 | 12/2022 | Nowell et al. |

FOREIGN PATENT DOCUMENTS

| | | | |
|---|---|---|---|
| CN | 109989912 A | 7/2019 | |
| CN | 210410620 U * | 4/2020 | ............... B01J 3/03 |
| CN | 111255677 A | 6/2020 | |
| GB | 2044347 A * | 10/1980 | ............... F04B 53/08 |

\* cited by examiner

US 12,404,857 B2

COOLING SLEEVE FOR USE WITH A FLUID END

SUMMARY

In certain embodiments, the present disclosure is directed to a fluid end comprising a housing having a rectilinear bore extending therethrough, a plunger configured to reciprocate within the housing, a stuffing box configured to surround at least a portion of the plunger, and a cooling sleeve surrounding at least a portion of the stuffing box. At least a portion of the plunger is situated within the bore.

In another aspect, certain embodiments of the present disclosure are directed to a fluid end comprising a housing having a bore formed therein, a stuffing box engaging the housing, a retainer attached to the housing by a plurality of fasteners, a plunger configured to reciprocate within the bore, a cooling sleeve attached to the housing by the plurality of fasteners, and a flow passage formed by the stuffing box and the cooling sleeve. The cooling sleeve surrounds the stuffing box.

In another aspect, certain embodiments of the present disclosure are directed to a fluid end having a rectilinear plunger path. The fluid end comprises a body having a bore aligned with the plunger path, an annular sleeve surrounding the plunger path, a stuffing box having an annular packing section that surrounds the plunger path, an annular cooling space that surrounds the plunger path, and a plunger reciprocable along the plunger path. The sleeve is joined to the body and has an inner surface and an opposed outer surface. The packing section is positioned within the sleeve and has an outer surface. The cooling space is closed at each end and is situated between the inner surface of the sleeve and the outer surface of the stuffing box. A fluid passage joins the inner and outer surfaces of the sleeve at the cooling space.

DETAILED DESCRIPTION

Figure 1:
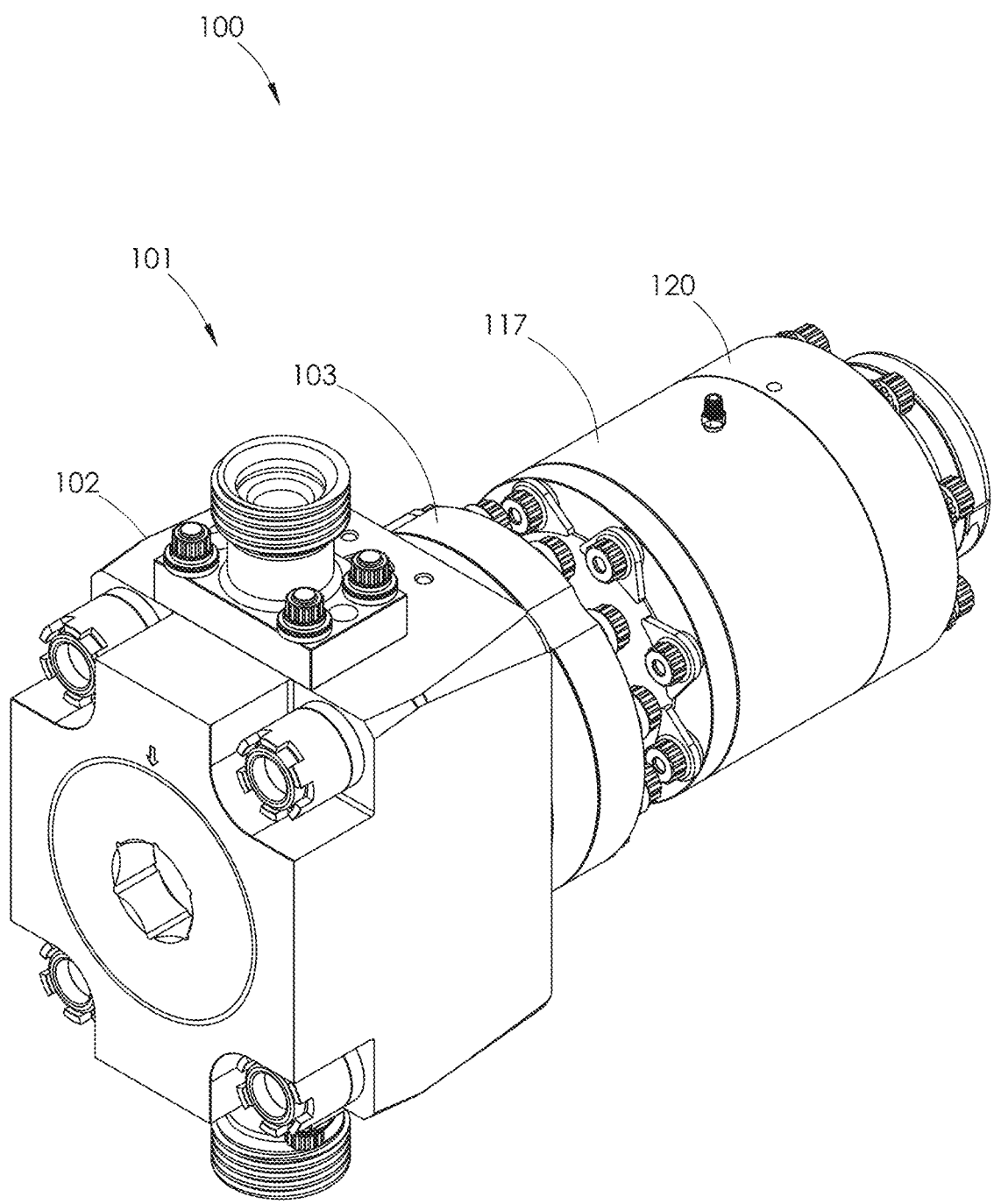
FIG. 1 is a front perspective view of one embodiment of a fluid end section described herein. One embodiment of a cooling sleeve disclosed herein is shown installed in the fluid end section.
Figure 2:
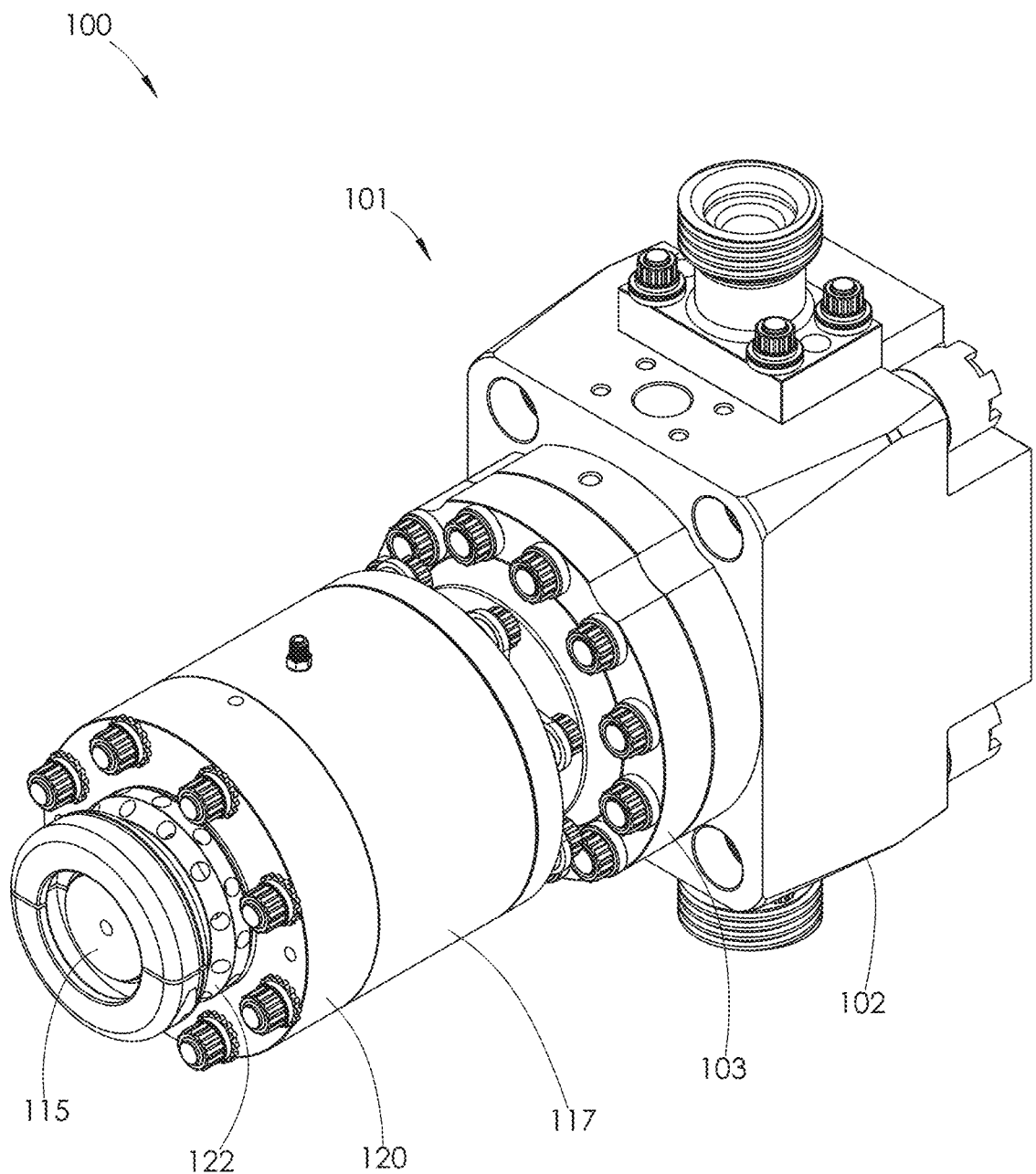
FIG. 2 is a rear perspective view of the fluid end section shown in FIG. 1.
Figure 3:
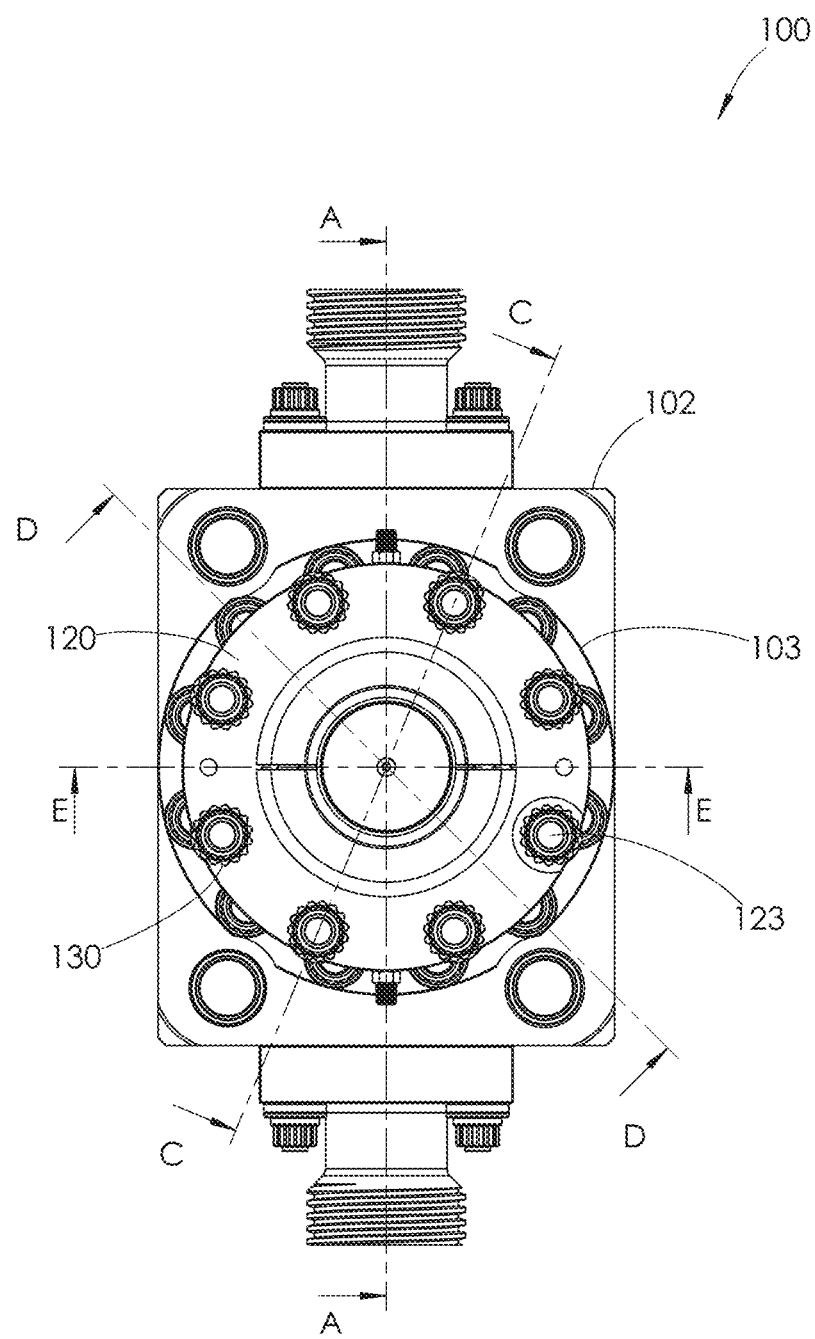
FIG. 3 is a rear elevation view of the fluid end section shown in FIG. 1.

High pressure reciprocating pumps typically comprise a power end assembly attached to a fluid end assembly. These pumps are typically used in oil and gas operations to deliver highly pressurized corrosive and/or abrasive fluids to piping leading to the wellbore. The power end assemblies are typically run by engines. An engine crankshaft is attached to a transmission input shaft, a transmission output shaft is connected to a gearbox input shaft, and a gearbox output shaft is attached to a power end crankshaft. The power end crankshaft reciprocates plungers within the fluid end assembly to pump fluid through the fluid end.

Fluid may be pumped through the fluid end assembly at pressures that range from 5,000-15,000 pounds per square inch (psi). However, the pressure may reach up to 22,500 psi. Power end assemblies typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends may collectively deliver about 4,200 gallons per minute or 100 barrels per minute to the wellbore.

During the operation of fluid end assemblies, one common issue is the overheating of components. Overheating typically occurs in areas where components wear against each other, or where components expand and retract relative to one another. Areas of particular concern are where components wear against the reciprocating plungers, such as near the plunger packings. High rates of reciprocation, along with tight tolerances between components, leads to an increase in temperatures. The increased temperatures cause components to expand. Such expansion, in addition to already high temperatures within the fluid ends, causes components to experience significant wear. When components wear beyond a certain critical point, they must be replaced. Such replacement costs valuable time and money. There is therefore an existing need to reduce temperatures of internal components within fluid end assemblies, in particular those surrounding the plungers. Such a reduction in temperatures would increase the operational lifetimes of components.

The present disclosure addresses these concerns by providing various embodiments of a cooling sleeve for use with fluid end sections. The cooling sleeve surrounds at least a portion of a stuffing box within a fluid end section. A plunger packing is situated within the stuffing box and is configured to surround a portion of a reciprocating plunger. Because the cooling sleeve surrounds the stuffing box, and thus also the plunger packing, the cooling sleeve effectively transfers heat away from the plunger packing and reciprocating plunger during operation. This cools down the components within the fluid end section, which increases their operational life.

The cooling sleeve may be attached to the fluid end section's housing by a plurality of fasteners. The cooling sleeve may also be attached to a rear retainer and the fluid end section's housing by a separate plurality of fasteners. Additionally, a plurality of dowel pins may be used to align the cooling sleeve to the fluid end section's housing during assembly.

The cooling sleeve effectively cools the components within the fluid end section by circulating a cooling sleeve, or coolant, within an annular flow passage. The annular flow passage is bounded by an interior surface of the cooling sleeve and an exterior surface of the stuffing box. The cooling sleeve also comprises an outer surface.

A plurality of passages are formed in the cooling sleeve. Each passage connects an opening formed on the interior surface of the cooling sleeve with an opening formed on the outer surface of the cooling sleeve. During operation, a cooling fluid, or coolant, enters the annular flow passage through one or more of the plurality of passages formed within the cooling sleeve. The coolant may then circulate within the annular flow passage and exit the annular flow passage through one or more of the passages formed within the cooling sleeve. Ideally, the coolant may exit the annular flow passage via a different passage than it entered in.

The plurality of passages formed in the cooling sleeve may receive threaded coolant fittings. Such coolant fittings may be connected to a cooling fluid source, such as a fluid manifold. When cooling fluid enters the annular passage, it may come from the source of coolant. When the fluid exits the annular passage, it may re-enter the same source of coolant, or pass into another void.

As discussed herein, the cooling sleeve may be attached to the fluid end section by a variety of ways. By adding these connection means, the cooling sleeve may be quickly and efficiently added during construction of the fluid end section. Additionally, the attachment means allow the cooling sleeve to be replaced easily.

By circulating fluid within the annular passage, the cooling sleeve adds additional cooling and heat transfer capabilities that are lacking from traditional fluid end assemblies. The targeted location of the cooling sleeve also results in a reduction of heat in areas that need it most.

Turning now to FIGS. 1-20, one embodiment of a fluid end section 100 described herein is shown. The various features of the fluid end section 100 not specifically described herein are described in more detail in U.S. Pat. No. 12,000,257, issued to Foster et al., (the '257 patent), the entire contents of which are incorporated herein by reference. U.S. Provisional Patent Application No. 63/602,912, authored by Thomas et al., is also incorporated herein by reference.

The fluid end section 100 comprises a housing 101. The housing 101 comprises a first section 102 and a second section 103. An annular wear ring 104 and an annular seal 105 are situated within the second section 103 of the housing 101. The second section 103 comprises a rear surface 106, a rear mounting flange 107, a rear projecting portion 108, and a horizontal bore 109. The bore 109 may be rectilinear, meaning straight path. The rear mounting flange 107 comprises a plurality of second passages 110, a plurality of dowel openings 111, and a plurality of threaded openings 112. The horizontal bore 109 comprises a second counterbore 113 and a stuffing box counterbore 114.

The fluid end section 100 further comprises a plunger 115 and a plurality of components attached to the rear surface 106 of the housing 101. The various components include a stuffing box 116, a cooling sleeve 117, a plurality of coolant fittings 118, a plurality of coolant seals 119, a rear retainer 120, a plunger packing 121, a packing nut 122, a plurality of second fasteners 123, a plurality of third fasteners 124, a plurality of first dowel pins 125, a plurality of second dowel pins 126, a plurality of blind nuts 127, a plurality of reaction washers 128, a plurality of seals 129, a plurality of washers 130, and a plurality of nuts 131. Each second fastener 123 comprises a first threaded end 132 and a second threaded end 133. Because the '257 Patent references "first fasteners" which join the first section of the housing to the second section of the housing, the fasteners 123 herein will be referred to as "second fasteners", and the fasteners 124 herein will be referred to as "third fasteners".

Figure 11:
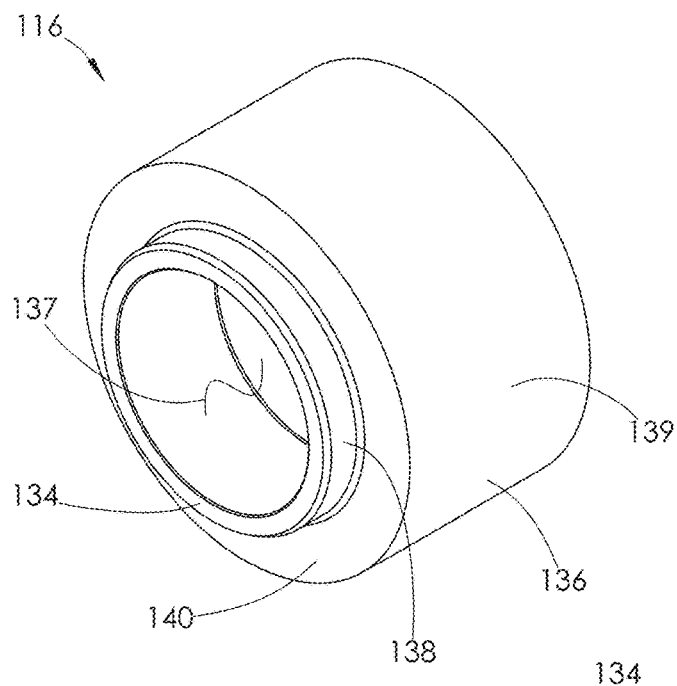
FIG. 11 is a front perspective view of a stuffing box used with the fluid end section shown in FIG. 1.
Figure 12:
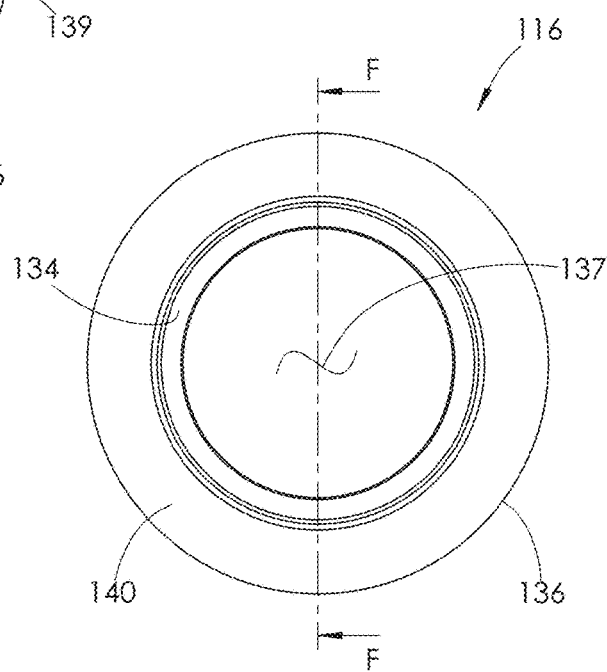
FIG. 12 is a front elevation view of the stuffing box shown in FIG. 11.
Figure 13:
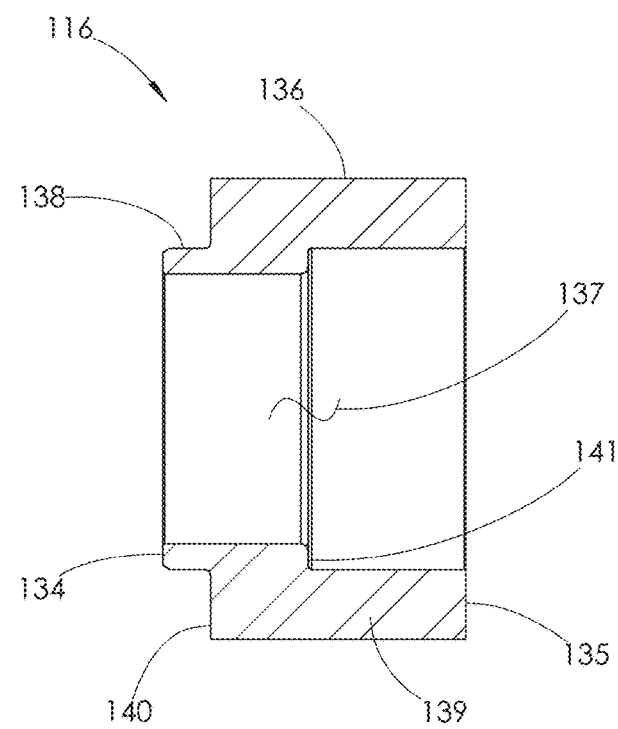
FIG. 13 is a cross-sectional view of the stuffing box shown in FIG. 12, taken along line F-F.
Figure 14:
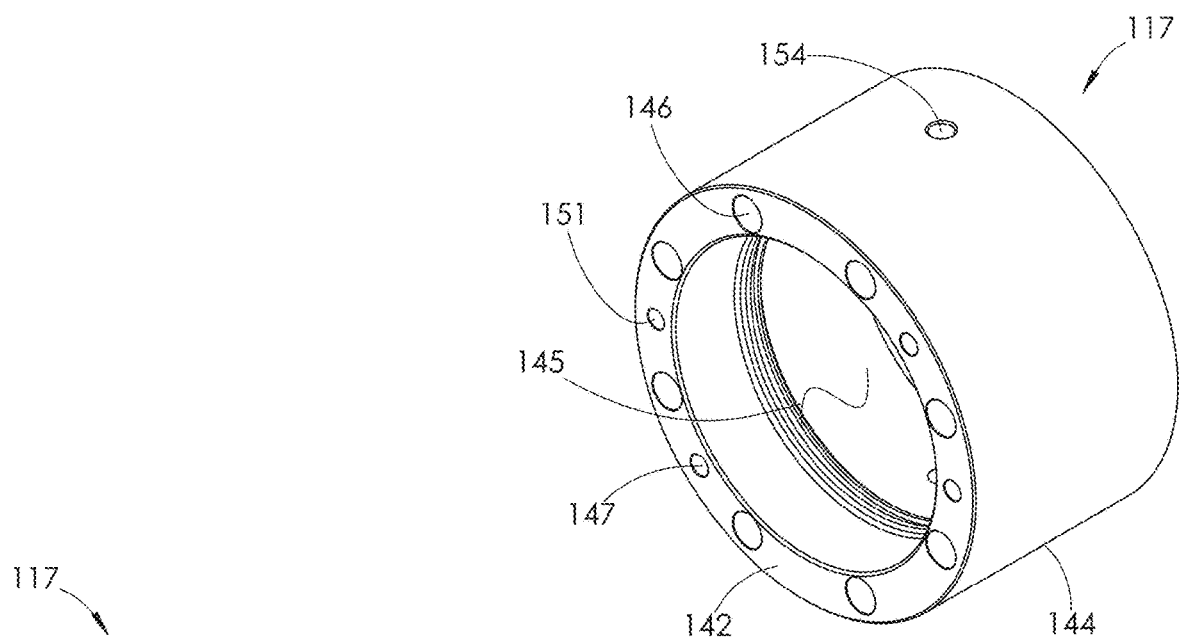
FIG. 14 is a front perspective view of a cooling sleeve used with the fluid end section shown in FIG. 12.
Figure 15:
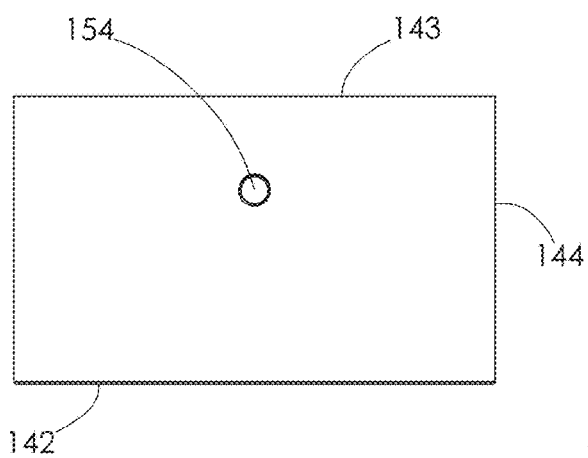
FIG. 15 is a top plan view of the cooling sleeve shown in FIG. 14.
Figure 16:
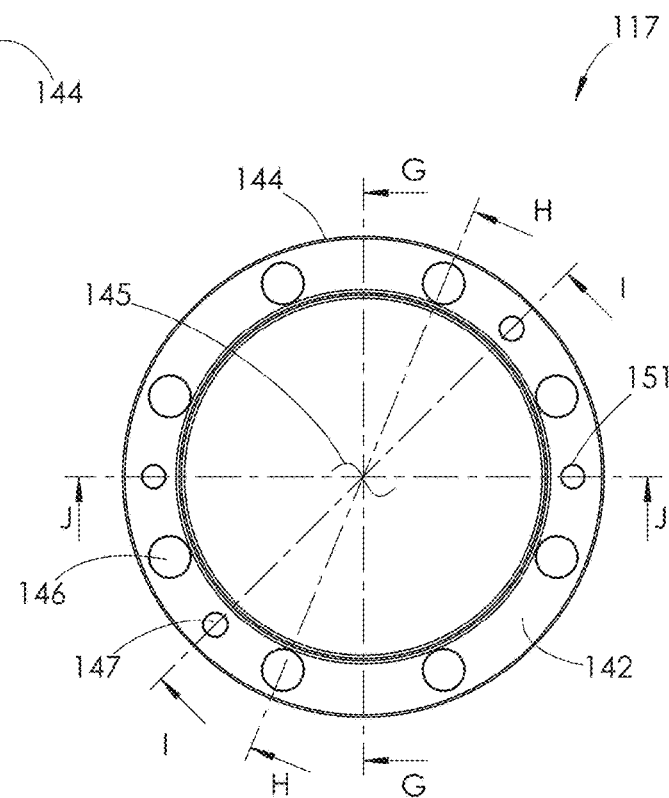
FIG. 16 is a front elevation view of the cooling sleeve shown in FIG. 14.

Referring now to FIGS. 11-13, the stuffing box 116 comprises front and rear surfaces 134 and 135 joined by an outer intermediate surface 136 and a central passage 137 formed therein. The stuffing box 116 further comprises a front portion 138 joined to a rear portion 139 such that a medial surface 140 is formed between the front and rear surfaces 134 and 135. The front portion 138 has a shorter length than the rear portion 139 and may be characterized as a front projecting portion 138. The central passage 137 comprises an internal shoulder 141 located within the rear portion 139 of the stuffing box 116.

Referring now to FIGS. 14-20, one embodiment of a cooling sleeve 117 is shown. The cooling sleeve 117 comprises front and rear surfaces 142 and 143 joined by an outer intermediate surface 144 and a central passage 145 formed therein. The cooling sleeve 117 further comprises a plurality of second fastener passages 146 that interconnect the front and rear surfaces 142 and 143. The second fastener passages 146 do not intersect any other passages, are parallel to the central passage 145, are evenly spaced circumferentially, and may be radially centered in a wall of the cooling sleeve 117.

The cooling sleeve 117 further comprises a plurality of countersunk passages 147 that interconnect the front and rear surfaces 142 and 143. The countersunk passages 147 do not intersect any other passages, are parallel to the central passage 145, are diametrically opposed, and may be centered in the wall of the cooling sleeve 117. Each countersunk passage 147 comprises a through bore 148, a countersink bore 149, and an internal shoulder 150. The countersink bore 149 originates at the rear surface 143 of the cooling sleeve 117.

The cooling sleeve 117 further comprises a plurality of dowel passages 151 that interconnect the front and rear surfaces 142 and 143. The dowel passages 151 do not intersect any other passages, are parallel to the central passage 145, are diametrically opposed, and may be centered in the wall of the cooling sleeve 117.

The central passage 145 comprises a plurality of reduced diameter sections 152. Each reduced diameter section 152 comprises a seal groove 153. The reduced diameter sections 152 are spaced longitudinally in the cooling sleeve 117.

The cooling sleeve 117 further comprises a plurality of threaded fitting passages 154 that interconnect the outer intermediate surface 144 to the central passage 145. The threaded fitting passages 154 are diametrically opposed and longitudinally located such that each is situated between the two reduced diameter sections 152.

Referring now to FIGS. 4-10, the assembly of the fluid end section 100 will be described. Beginning with the housing 101 fully assembled as described in the '257 patent, the first dowel pins 125 are inserted in the dowel openings 111 of the rear mounting flange 107 such that approximately half the length of each first dowel pin 125 protrudes from the rear mounting flange 107.

Figure 8:
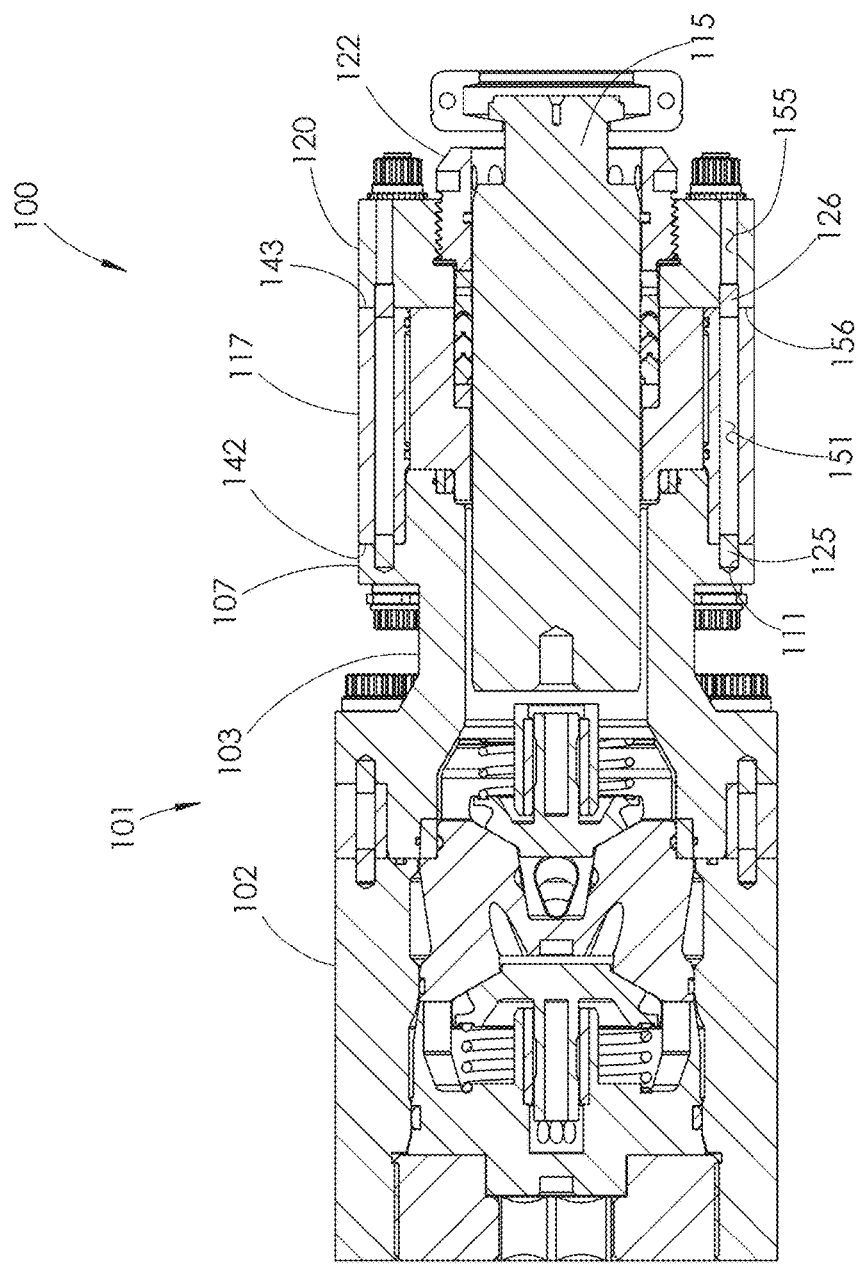
FIG. 8 is a cross-sectional view of the fluid end section shown in FIG. 3, taken along line E-E.
Figure 9:
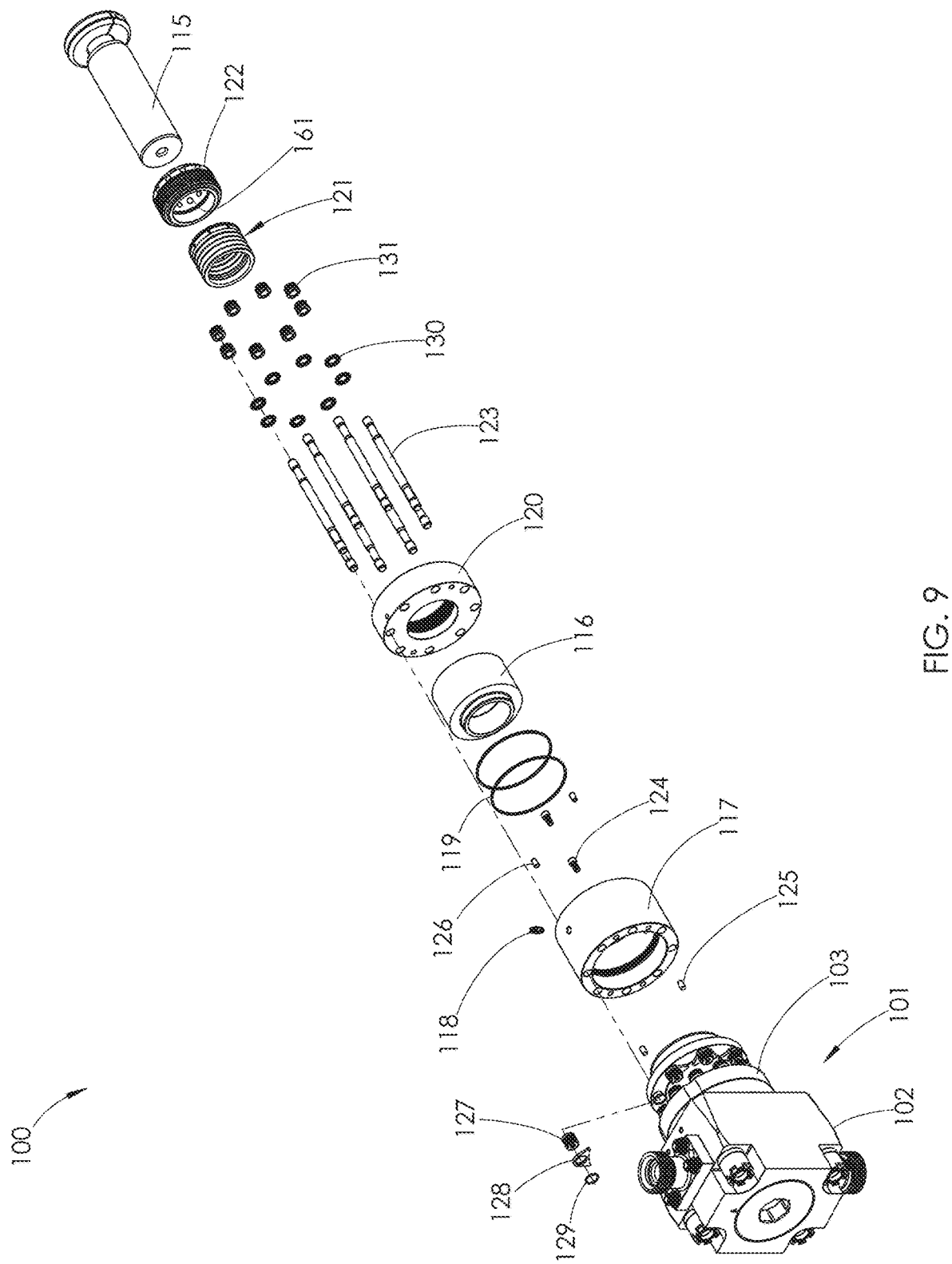
FIG. 9 is a partially exploded front perspective view of the fluid end section shown in FIG. 1.
Figure 10:
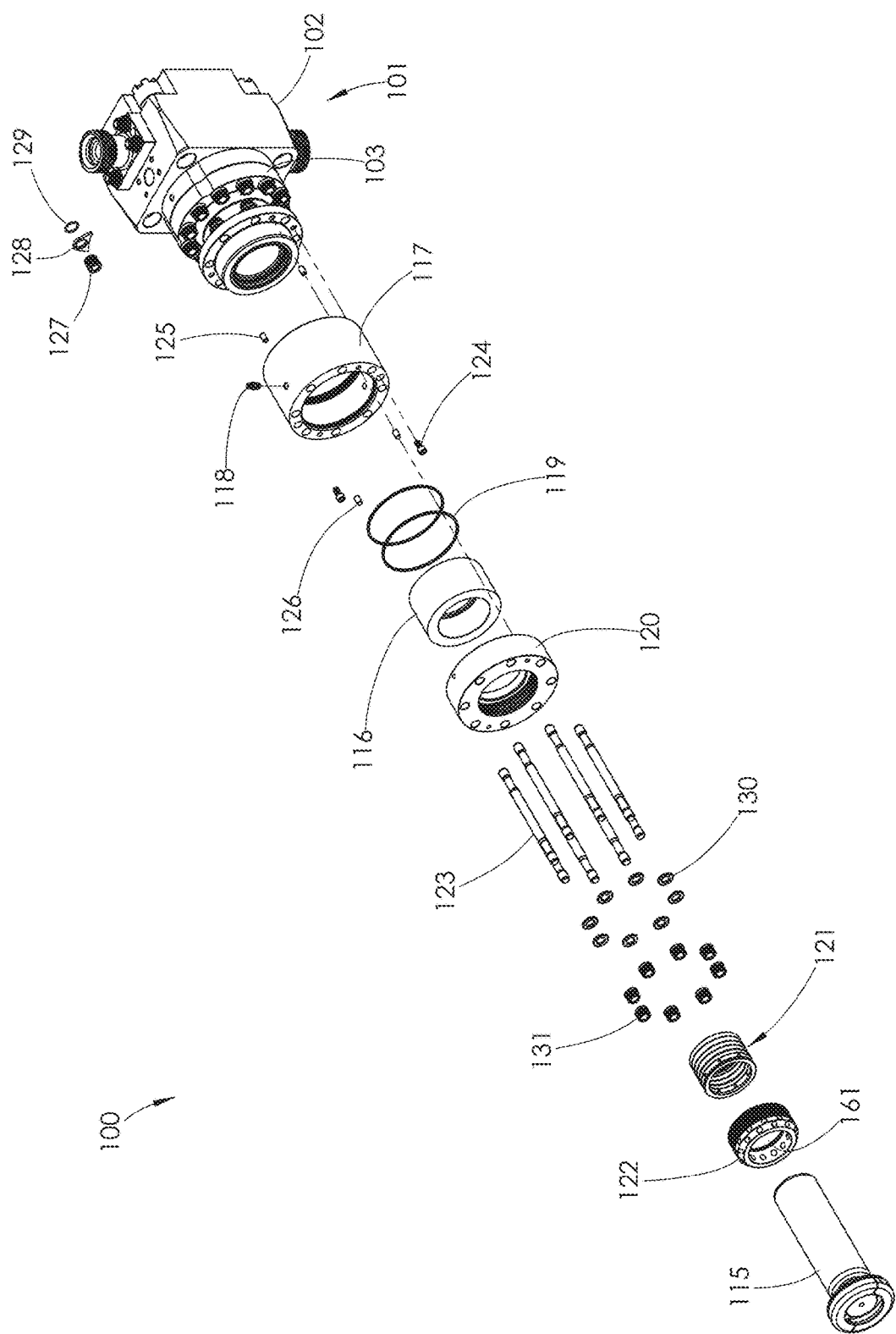
FIG. 10 is a partially exploded rear perspective view of the fluid end section shown in FIG. 1.

Second, the dowel passages 151 of the cooling sleeve 117 are aligned with the protruding first dowel pins 125. The cooling sleeve 117 is then moved toward the rear mounting flange 107 until front surface 142 of the cooling sleeve 117 contacts the rear mounting flange 107, as shown in FIG. 8. Once in this position, the protruding portions of the first dowel pins 125 are received by the dowel passages 151 of the cooling sleeve 117. The first dowel pins 125 support the cooling sleeve 117 until it can be more securely attached by the third fasteners 124.

Figure 7:
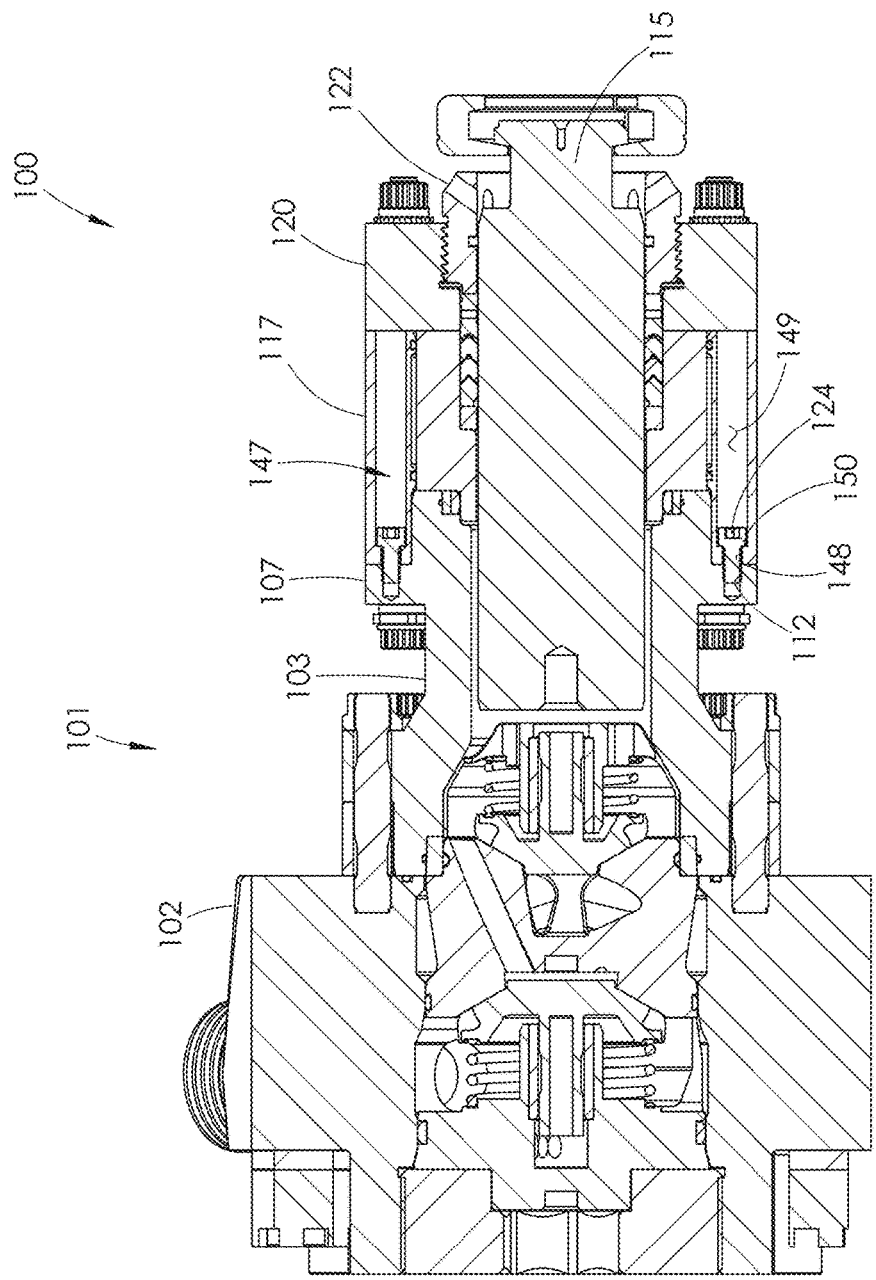
FIG. 7 is a cross-sectional view of the fluid end section shown in FIG. 3, taken along line D-D.

Third, the third fasteners 124 are inserted in the countersink bores 149 of the countersunk passages 147 and torqued into the threaded openings 112 of the rear mounting flange 107 such that the heads of the third fasteners 124 engage the internal shoulder 150 of the countersunk passage 147, as shown in FIG. 7. The third fasteners 124 securely attach the cooling sleeve 117 to the housing 101 during the remainder of assembly.

Figure 17:
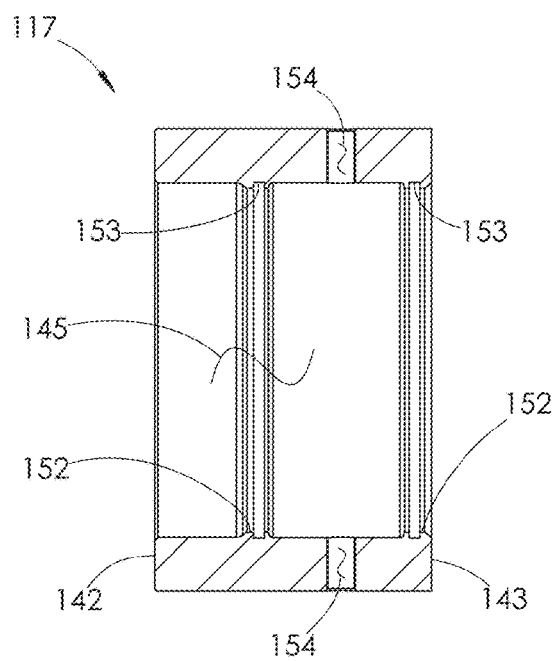
FIG. 17 is a cross-sectional view of the cooling sleeve shown in FIG. 16, taken along line G-G.
Figure 18:
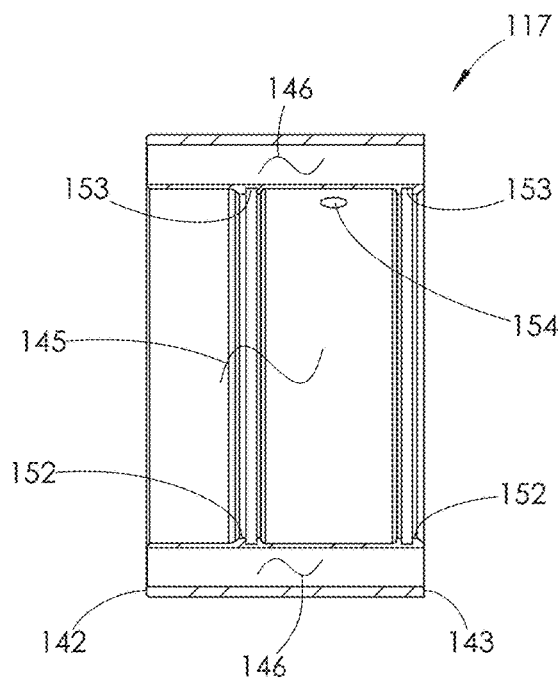
FIG. 18 is a cross-sectional view of the cooling sleeve shown in FIG. 16, taken along line H-H.
Figure 19:
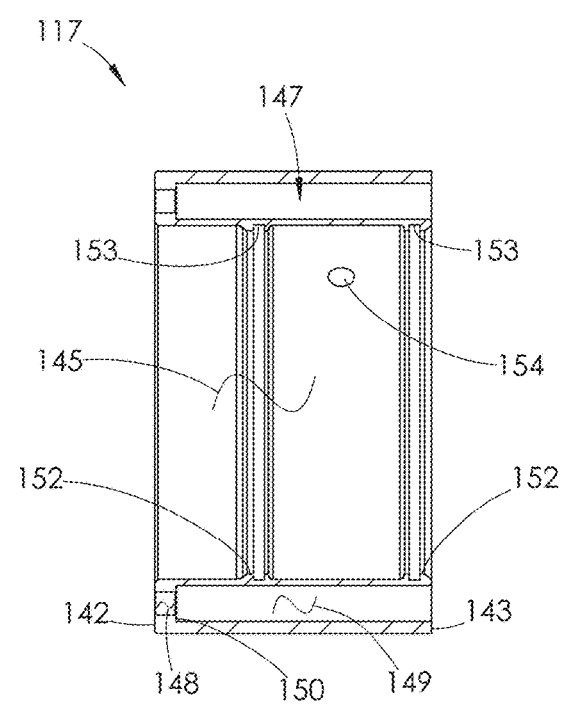
FIG. 19 is a cross-sectional view of the cooling sleeve shown in FIG. 16, taken along line I-I.
Figure 20:
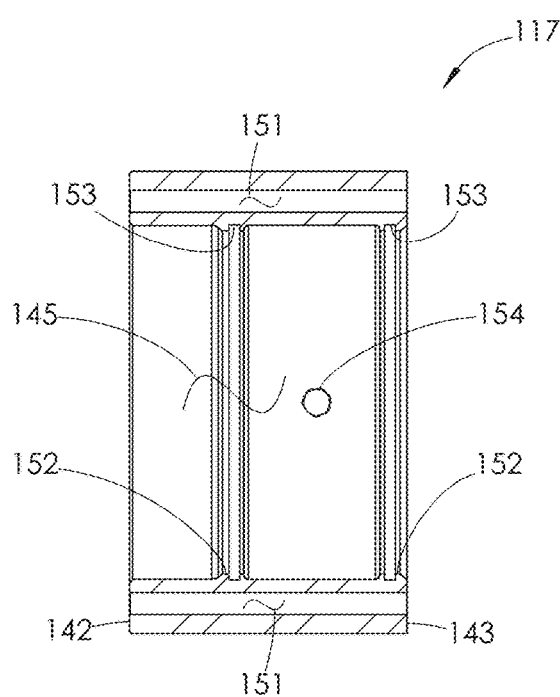
FIG. 20 is a cross-sectional view of the cooling sleeve shown in FIG. 16, taken along line J-J.
Figure 21:
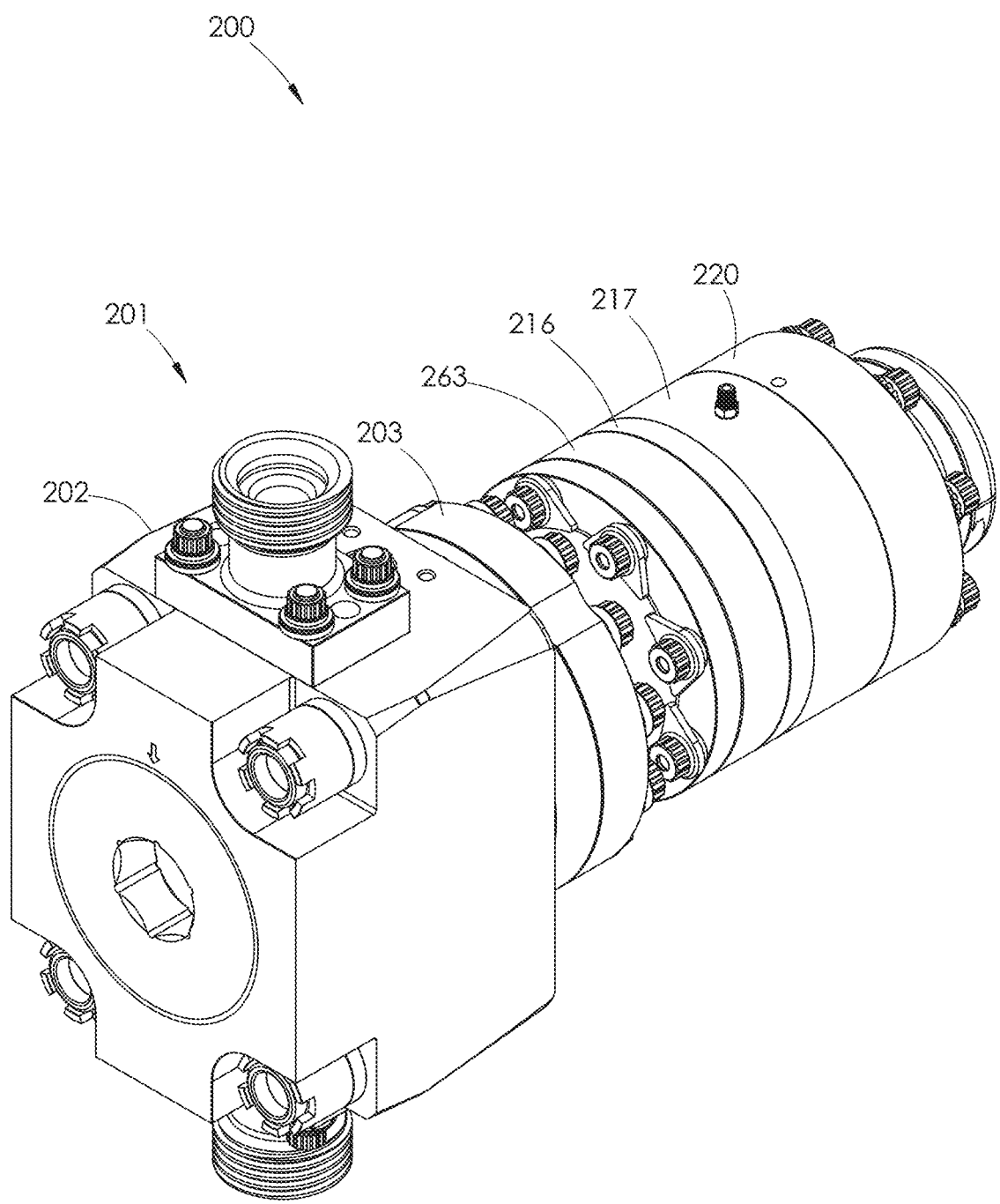
FIG. 21 is a front perspective view of another embodiment of a fluid end section described herein. Another embodiment of a cooling sleeve disclosed herein is shown installed in the fluid end section.
Figure 22:
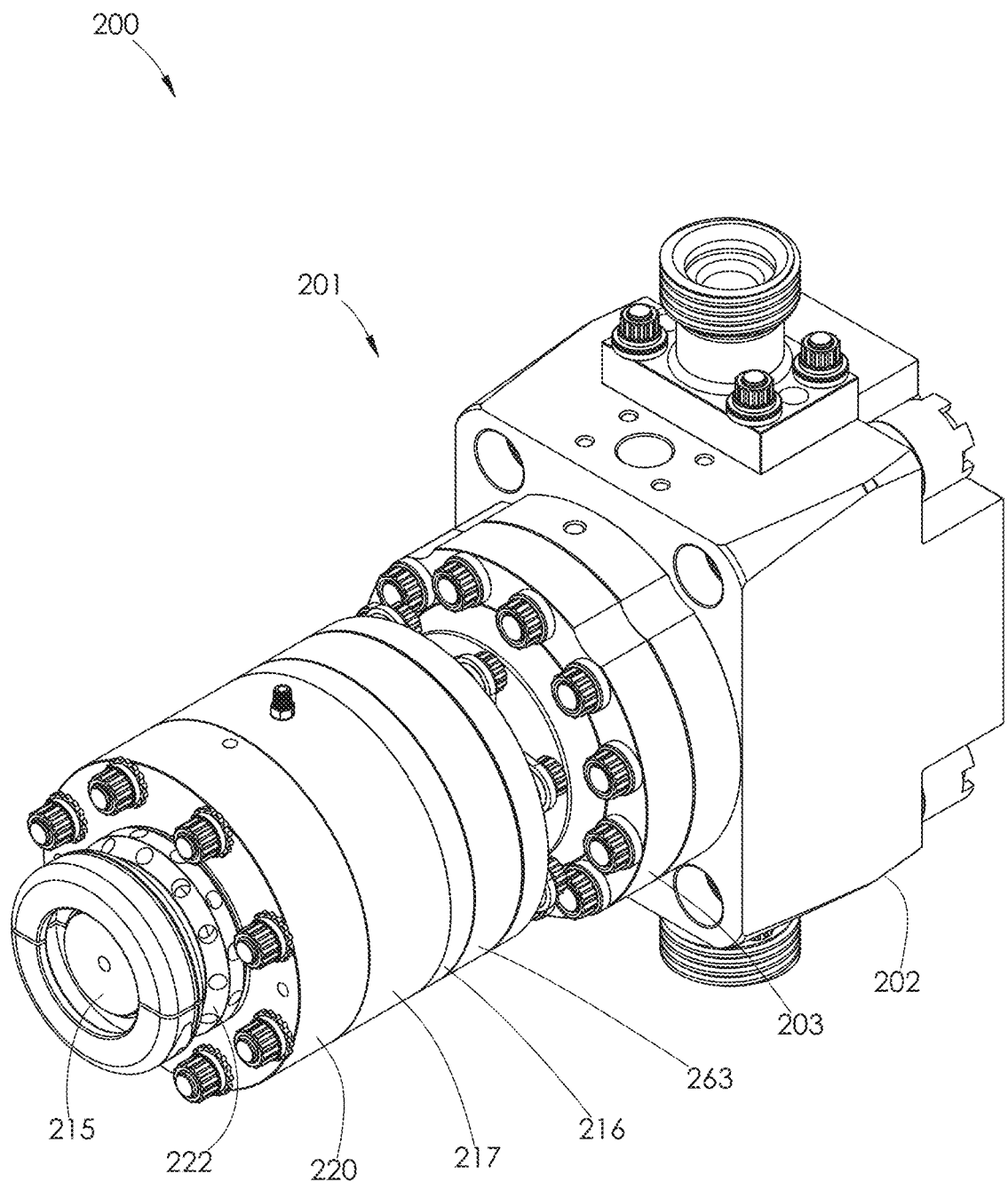
FIG. 22 is a rear perspective view of the fluid end section shown in FIG. 21.
Figure 23:
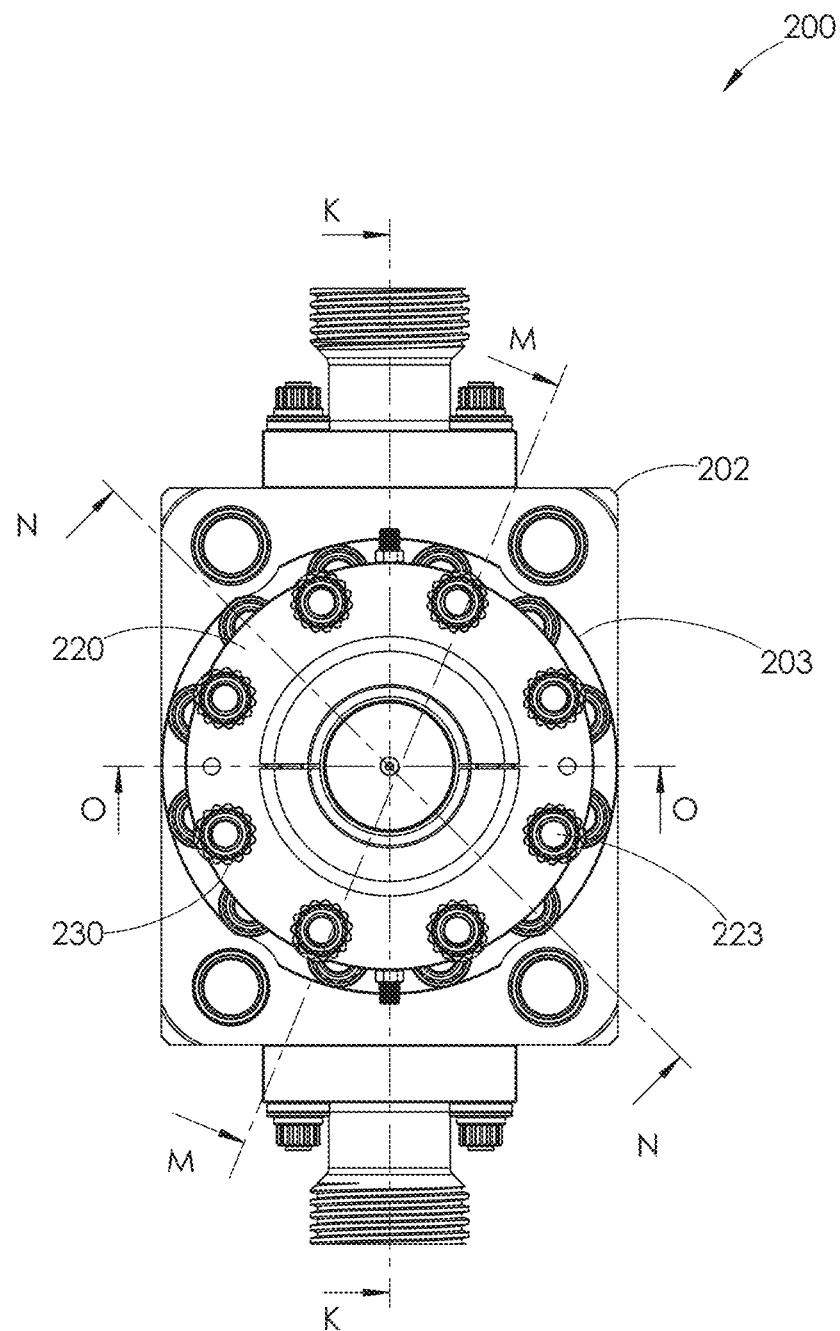
FIG. 23 is a rear elevation view of the fluid end section shown in FIG. 21.

At this point in the assembly, the rear projecting portion 108 of the second section 103 is situated in the central passage 145 of the cooling sleeve 117. Specifically, the rear projecting portion 108 of the second section 103 is situated in the front section of the central passage 145 of the cooling sleeve 117. The front section is defined as the section between the front surface 142 of the cooling sleeve 117 and the reduced diameter section 152 of the central passage 145 that is closest to the front surface 142 of the cooling sleeve 117, as shown in FIG. 17.

Figure 5:
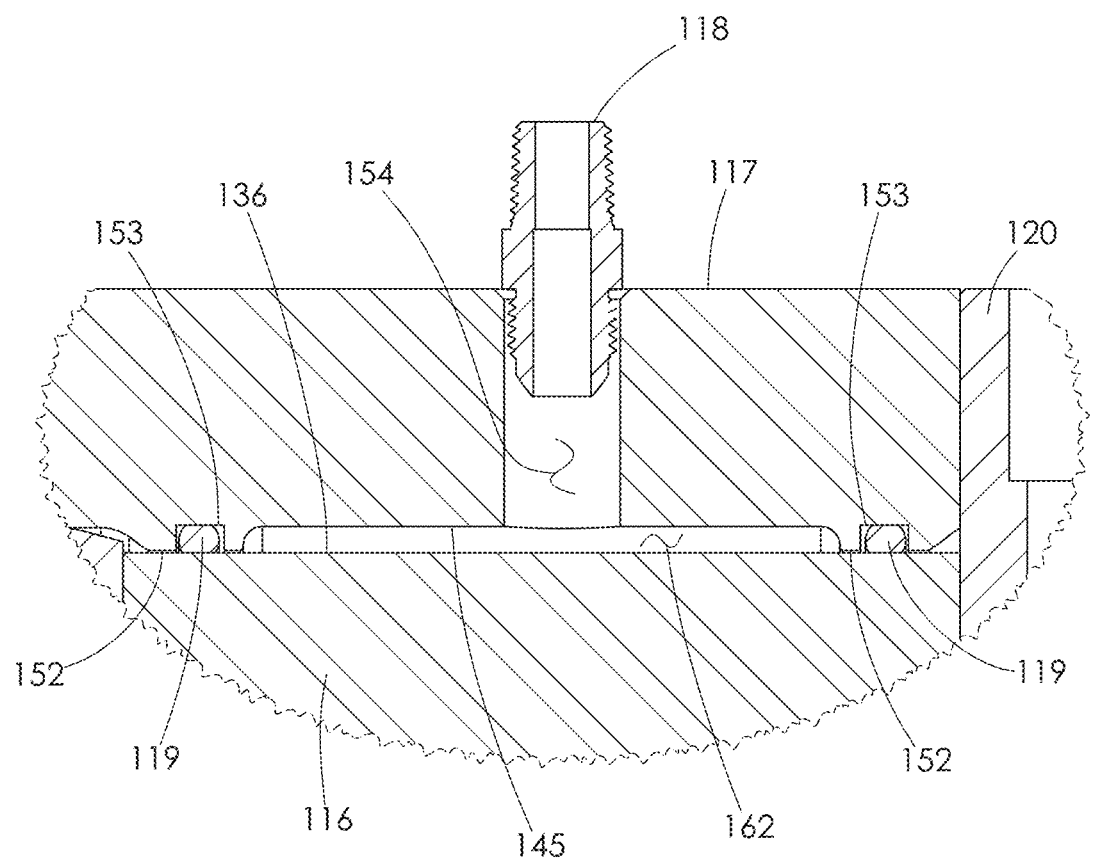
FIG. 5 is an enlarged view of area B of FIG. 4.

Fourth, the coolant seals 119 are inserted into the seal grooves 153 of the reduced diameter sections 152 of the central passage 145 of the cooling sleeve 117, as shown in FIG. 5.

Figure 4:
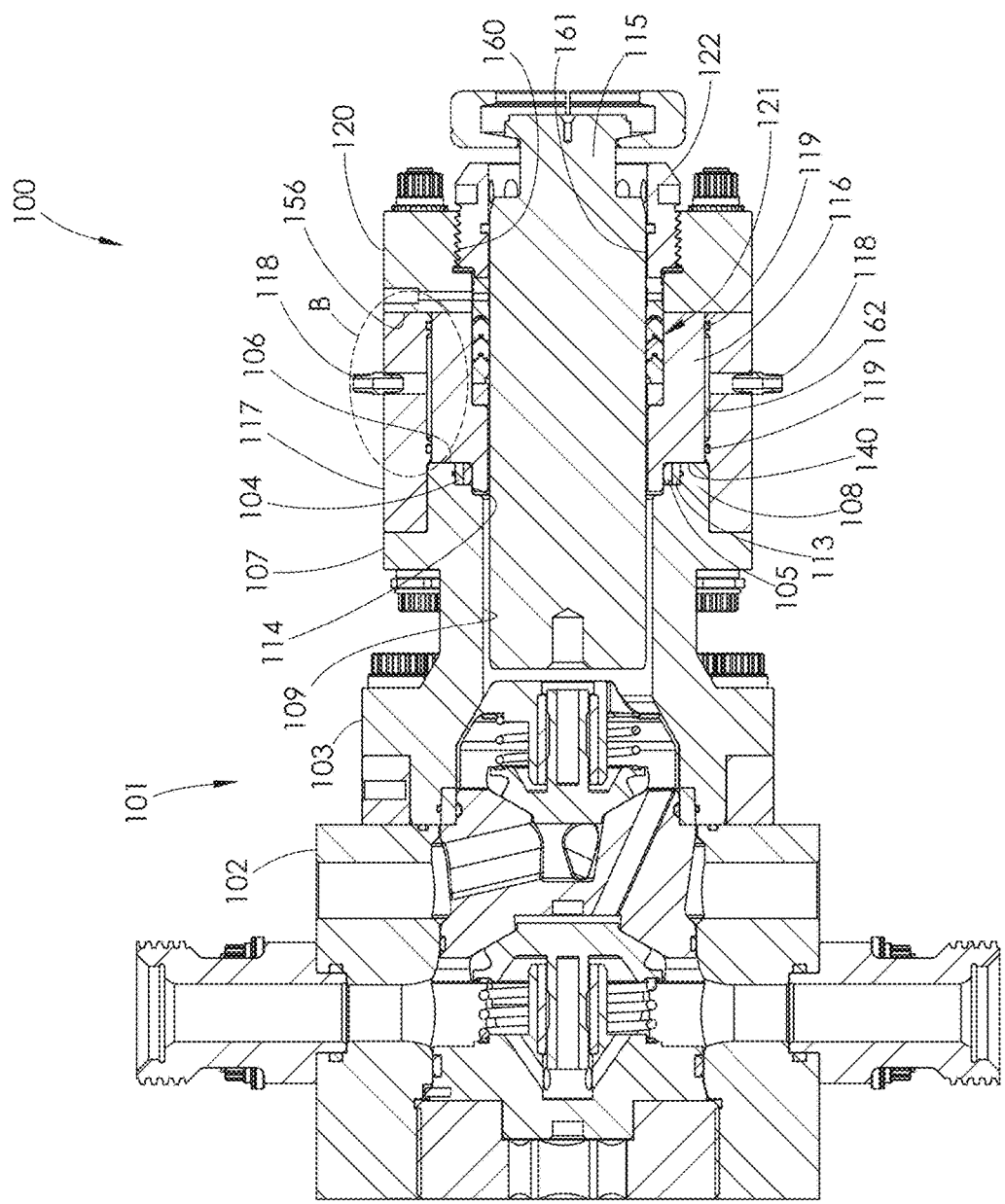
FIG. 4 is a cross-sectional view of the fluid end section shown in FIG. 3, taken along line A-A.

Fifth, the central passage 137 of the stuffing box 116 is aligned with the central passage 145 of the cooling sleeve 117 and the stuffing box 116 is inserted into the cooling sleeve 117 oriented such that the front projecting portion 138 is inserted first. The stuffing box 116 is inserted until the medial surface 140 of the stuffing box 116 contacts the rear surface 106 of the second section 103 of the housing 101, as shown in FIG. 4. At this point in the assembly, the coolant seals 119 are in contact with the outer intermediate surface 136 of the stuffing box 116, the annular seal 105 is in contact with the front projecting portion 138 of the stuffing box 116, and the front surface 134 of the stuffing box 116 is in the stuffing box counterbore 114 of the second section 103.

The annular wear ring 104 and annular seal 105 are situated within the second counterbore 113 of the second section 103. The annular wear ring 104 may contact the second section 103 along a base of the second counterbore 113. The annular wear ring may also contact the medial surface 140 of the stuffing box 116 at points during operation. A seal is positioned within a wall of the second counterbore 113. Such seal engages an outer surface of the annular ring 104, preventing leakage between the annular ring 104 and the second counterbore's wall.

The annular wear ring 104 surrounds and engages the annular seal 105, which surrounds and engages the front projecting portion 138 of the stuffing box 116. The annular seal 105 thus prevents leaks between the front projecting portion 138 and the annular wear ring 104. The annular seal 105 may also contact the second section 103 along the base of the second counterbore 113, and the medial surface 140 of the stuffing box 116.

Sixth, the second dowel pins 126 are inserted into the dowel passages 151 at the rear surface 143 of the cooling sleeve 117 such that approximately half the length of the second dowel pins 126 protrude from the rear surface 143 of the cooling sleeve 117, as shown in FIG. 8.

Seventh, the dowel openings 155 of the rear retainer 120 are aligned with the second dowel pins 126 protruding from the rear surface 143 of the cooling sleeve 117. The rear retainer 120 is then moved toward the cooling sleeve 117 until the front surface 156 of the rear retainer 120 contacts the rear surface 143 of the cooling sleeve 117, as shown in FIG. 8. At this point of the assembly, the second passages 110 of the rear mounting flange 107, the second fastener passages 146 of the cooling sleeve 117, and the second fastener passages 157 of the rear retainer 120 are all aligned, as shown in FIG. 6.

Figure 6:
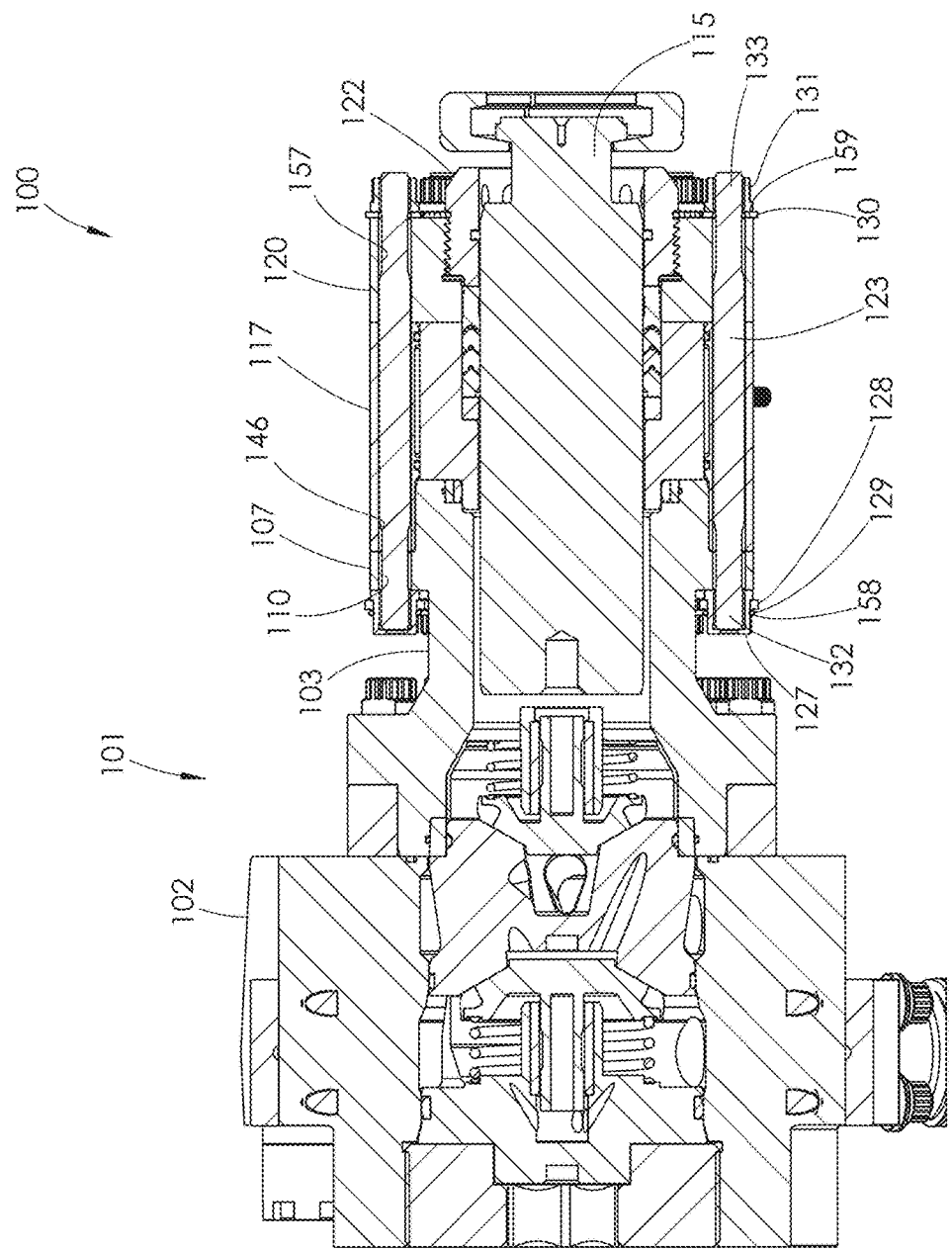
FIG. 6 is a cross-sectional view of the fluid end section shown in FIG. 3, taken along line C-C.

Eighth, referring to FIG. 6, the first threaded end 132 of a second fastener 123 is inserted into one of the second fastener passages 157 of the rear retainer 120 until the first threaded end 132 protrudes out the rear mounting flange 107. A blind nut 127 is then torqued on the first threaded end 132. A reaction washer is 128 placed over the blind nut 127 and a seal 129 is stretched over the blind nut 127 and seated in the groove 158 of the blind nut 127.

The second threaded end 133 protrudes from the rear surface 159 of the rear retainer 120. A washer 130 is placed over the protruding second threaded end 133 and a nut 131 is then threaded onto the second threaded end 133 but not torqued. This step is repeated for each second fastener 123. After all the second fasteners 123 are assembled as described above, full torque is applied to each nut 131 in a manner that assures even clamping forces are applied to the components between the blind nuts 127 and nuts 131.

Ninth, referring to FIG. 4, the plunger packing 121 is inserted into the central passage 137 of the stuffing box 116 and the packing nut 122 is threaded into the internal threads 160 of the rear retainer 120 but not torqued. The plunger 115 is then inserted into the central passage 161 of the packing nut 122 until the front of the plunger 115 extends through the plunger packing 121. The packing nut 122 is then torqued to specification, compressing the plunger packing 121 and providing a seal which prevents high pressure fluid from leaking during operation.

Tenth, the coolant fittings 118 are torqued into the threaded fitting passages 154 and a coolant circulation system (not shown) is connected to each coolant fitting 118.

Operation of the fluid end section 100 with regards to the pumping of high pressure fluid is as described in the '257 patent.

Referring now to FIGS. 4-5, an annular flow passage 162 is shown. The annular flow passage 162 is the volume bounded by the wall of the central passage 145 of the cooling sleeve 117, the outer intermediate surface 136 of the stuffing box 116, and the reduced diameter sections 152 of the central passage 145 of the cooling sleeve 117. During operation, a cooling fluid, or coolant, is pumped into one of the coolant fittings 118. The coolant flows in the annular flow passage 162 around the stuffing box 116 and exits the annular flow passage 162 through a second one of the coolant fittings 118. As coolant flows from entry to exit, it absorbs heat generated by the relative movement between the plunger packing 121 and the plunger 115. This heat absorption cools the stuffing box 116, which in turn absorbs heat from the plunger packing 121 and cools the plunger packing 121. Reducing the operating temperature of the plunger packing 121 increases the operational life of the plunger packing 121, which in turn increases the maintenance intervals and reduces operating costs.

In certain embodiments, the coolant may come from fluid already being delivered to the housing 101 via the suction manifold. For example, the coolant fitting 118 may be interconnected with the suction manifold or another pipe in fluid communication with the suction manifold. Coolant exiting the second coolant fitting 118 may be returned to the fluid supply reservoir.

In alternative embodiments, the coolant may come from a different and separate fluid source that is not in fluid communication with the suction manifold. Coolant exiting the second coolant fitting 118 in these alternative embodiments may be pumped back into the separate fluid source where it is cooled and recirculated.

In certain embodiments, the flow of coolant within the cooling sleeve 117 may be caused by movement or vibration imparted on the housing 101 by the reciprocating plunger 115. In alternative embodiments, the flow of coolant within the cooling sleeve 117 may be caused by a separate pump system connected to the coolant fittings 118.

Furthermore, the coolant may be the same fluid being pumped by the fluid end, or a derivative of the fluid being pumped by the fluid end. In alternative embodiments, the coolant may be an entirely different fluid from the fluid being pumped by the fluid end.

Turning to FIGS. 21-47, another embodiment of a fluid end section 200 is shown. The various features of the fluid end section 200 not specifically described herein are described in the '257 patent.

The fluid end section 200 comprises a housing 201. The housing 201 comprises a first section 202 and a second section 203. An annular wear ring 204 and an annular seal 205 are situated within the second section 203 of the housing 201. The second section 203 comprises a rear surface 206, a rear mounting flange 207, a rear projecting portion 208, and a horizontal bore 209. The rear mounting flange 207 comprises a plurality of second passages 210, a plurality of dowel openings 211, and a plurality of threaded openings 212. The horizontal bore 209 is rectilinear, meaning straight path, and comprises a second counterbore 213 and a stuffing box counterbore 214.

The fluid end section 200 further comprises a plunger 115 and a plurality of components attached to the rear surface 206 of the housing 201. The various components include a rear spacer sleeve 263, a stuffing box 216, a cooling sleeve 217, a plurality of coolant fittings 218, a plurality of coolant seals 219, a rear retainer 220, a plunger packing 221, a packing nut 222, a plurality of second fasteners 223, a plurality of third fasteners 224, a plurality of first dowel pins 225, a plurality of second dowel pins 226, a plurality of third dowel pins 264, a plurality of fourth dowel pins 265, a plurality of blind nuts 227, a plurality of reaction washers 228, a plurality of seals 229, a plurality of washers 230, and a plurality of nuts 231. Each second fastener 223 comprises a first threaded end 232 and a second threaded end 233.

Referring now to FIGS. 31-36, the rear spacer sleeve 263 comprises opposed front and rear surfaces 266 and 267 joined by a central opening 268 and an outer intermediate surface 269. A plurality of second fastener passages 270 are formed in the rear spacer sleeve 263. The second fastener passages 270 do not intersect any other passages, are parallel to the central opening 268, are evenly spaced circumferentially, and may be radially centered in the wall of the rear spacer sleeve 263. The rear spacer sleeve 263 further comprises a plurality of countersunk passages 271 that interconnect the front and rear surfaces 266 and 267. The countersunk passages 271 do not intersect any other passages, are parallel to the central opening 268, are diametrically opposed, and may be centered in the wall of the rear spacer sleeve 263. Each countersunk passage 271 comprises a through bore 272, a countersink bore 273, and an internal shoulder 274. The countersink bore 273 originates at the rear surface 267 of the rear spacer sleeve 263. The rear spacer sleeve 263 further comprises a plurality of dowel passages 275 that interconnect the front and rear surfaces 266 and 267. The dowel passages 275 do not intersect any other passages, are parallel to the central passage 268, are diametrically opposed, and may be centered in the wall of the rear spacer sleeve 263.

Referring now to FIGS. 37-42, the stuffing box 216 comprises front and rear surfaces 234 and 235 joined by an outer intermediate surface 236 and a central passage 237 formed therein. The stuffing box 216 further comprises a front portion 238 joined to a rear portion 239 by a flange 276. The front portion 238 has a shorter length than the rear portion 239 and may be characterized as a front projecting portion 238. The central passage 237 comprises an internal shoulder 241 located within the rear portion 239 of the stuffing box 216. The flange 276 comprises a front surface 277, a rear surface 278, a plurality of second fastener passages 279, and a plurality of dowel passages 280. The second fastener passages 279 do not intersect any other passages, are parallel to the central passage 237, are evenly spaced circumferentially, and may be radially centered in the flange 276. The dowel passages 280 do not intersect any other passages, are parallel to the central passage 237, are diametrically opposed, and may be centered in the flange 276.

Referring now to FIGS. 43-47, the cooling sleeve 217 comprises front and rear surfaces 242 and 243 joined by an outer intermediate surface 244 and a central passage 245 formed therein. The cooling sleeve 217 further comprises a plurality of second fastener passages 246 that interconnect the front and rear surfaces 242 and 243. The second fastener passages 246 do not intersect any other passages, are parallel to the central passage 245, are evenly spaced circumferentially, and may be radially centered in a wall of the cooling sleeve 217.

The cooling sleeve 217 further comprises a plurality of dowel passages 251 that interconnect the front and rear surfaces 242 and 243. The dowel passages 251 do not intersect any other passages, are parallel to the central passage 245, are diametrically opposed, and may be centered in the wall of the cooling sleeve 217.

The central passage 245 comprises a plurality of reduced diameter sections 252. Each reduced diameter section 252 comprises a seal groove 253. The reduced diameter sections 252 are spaced longitudinally in the cooling sleeve 217.

The cooling sleeve 217 further comprises a plurality of threaded fitting passages 254 that interconnect the outer intermediate surface 244 to the central passage 245. The threaded fitting passages 254 are diametrically opposed and longitudinally located such that each is situated between the two reduced diameter sections 252.

Referring now to FIGS. 24-30, the assembly of the fluid end section 200 will be described. Beginning with the housing 201 fully assembled as described in the '257 patent, the first dowel pins 225 are inserted in the dowel openings 211 of the rear mounting flange 207 such that approximately half of the length of each first dowel pin 225 protrudes from the rear mounting flange 207.

Figure 28:
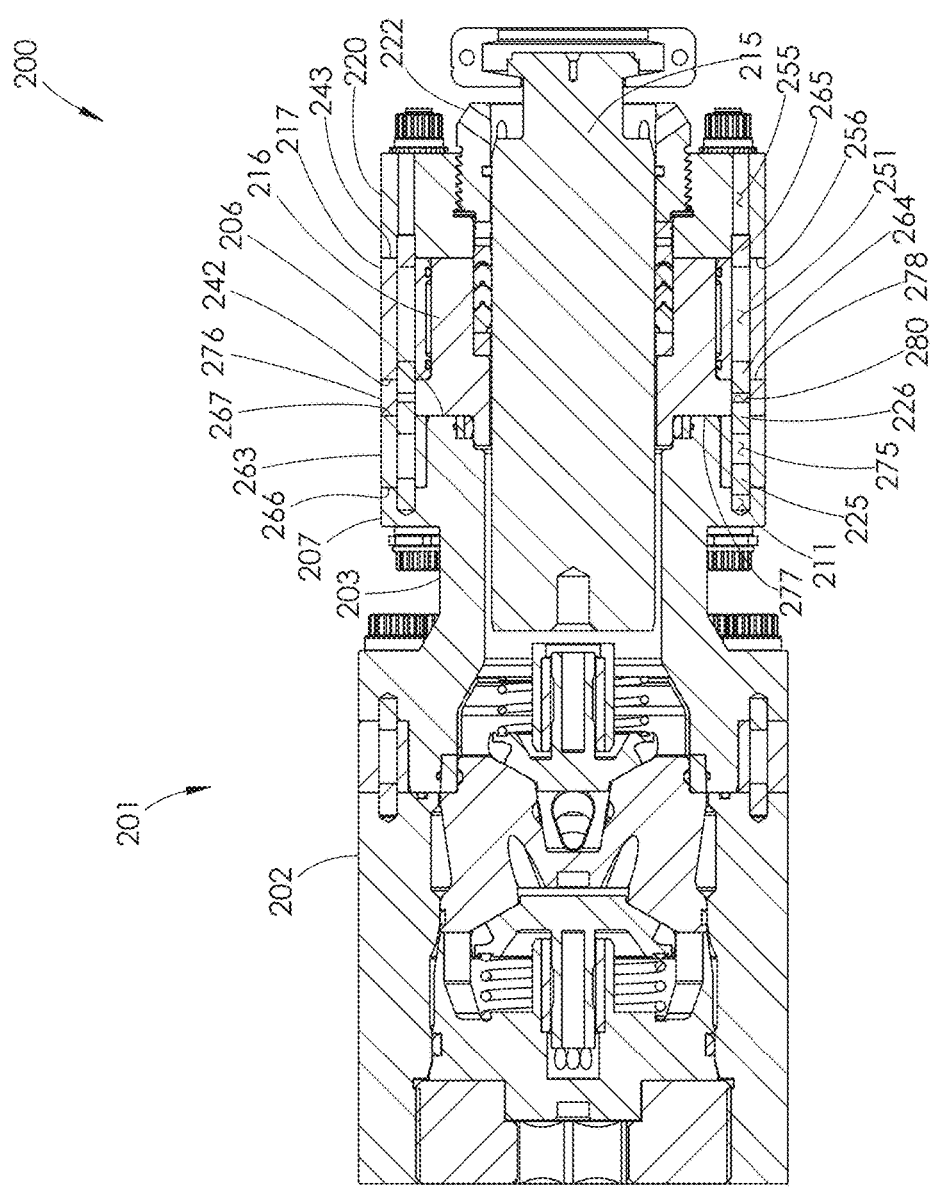
FIG. 28 is a cross-sectional view of the fluid end section shown in FIG. 23, taken along line O-O.
Figure 29:
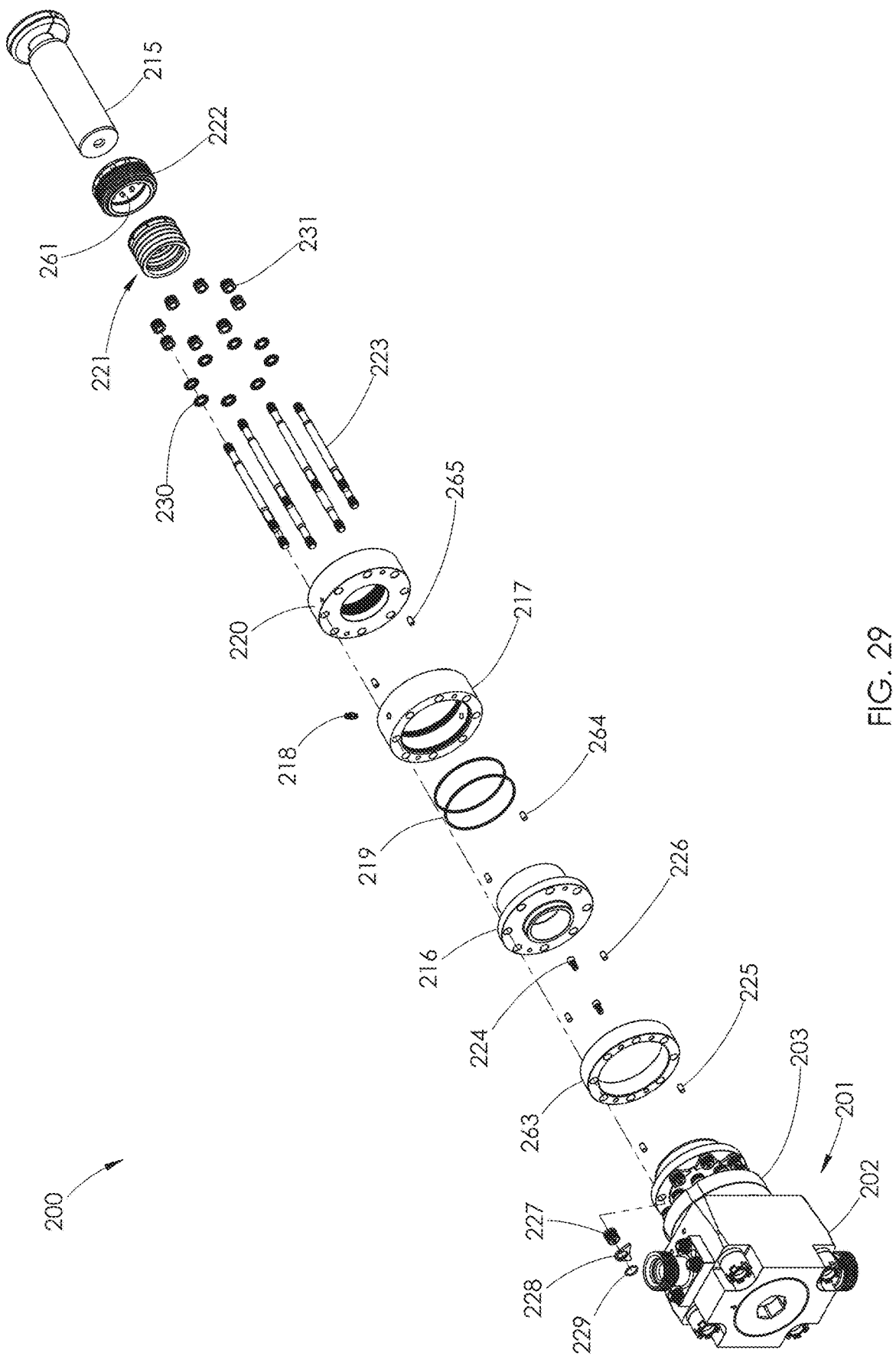
FIG. 29 is a partially exploded front perspective view of the fluid end section shown in FIG. 21.
Figure 30:
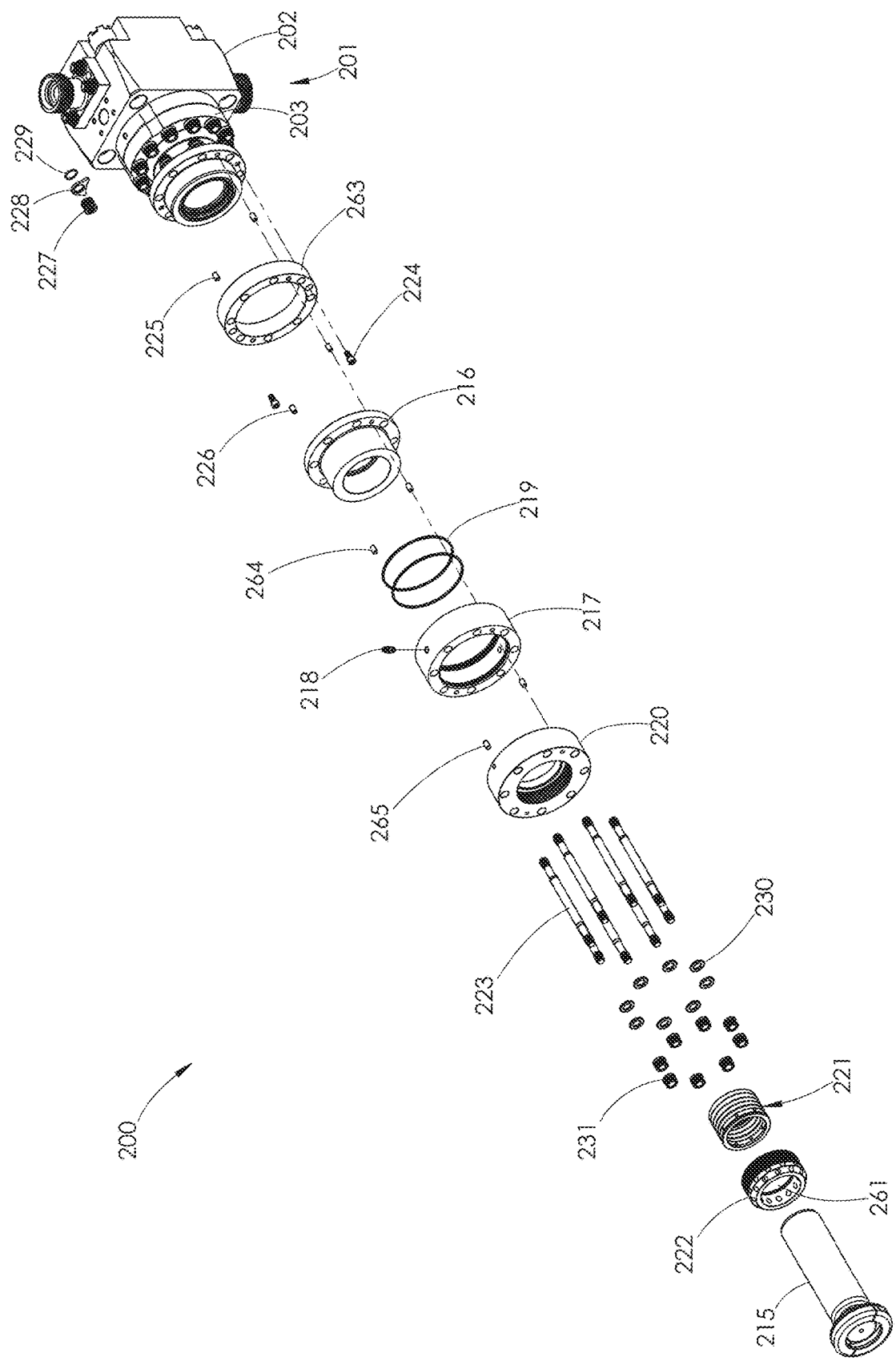
FIG. 30 is a partially exploded rear perspective view of the fluid end section shown in FIG. 21.
Figure 31:
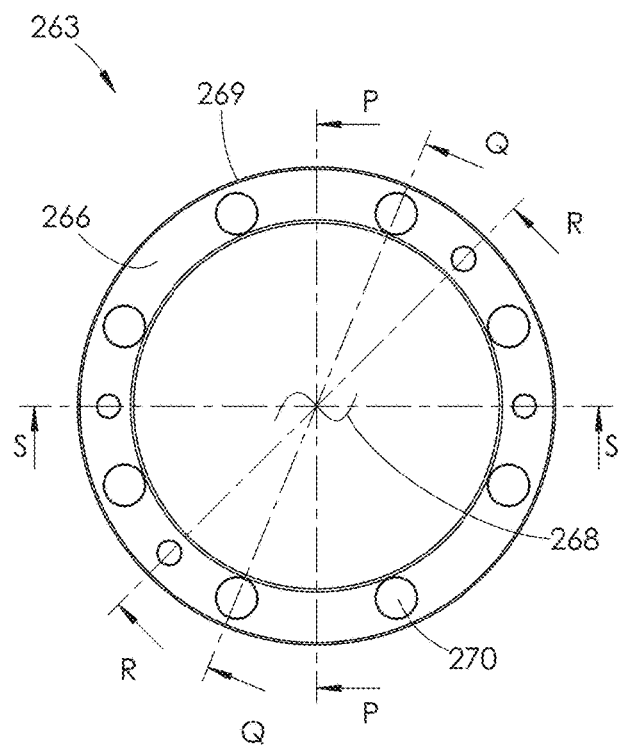
FIG. 31 is a front elevation view of a rear spacer used with the fluid end section shown in FIG. 21.
Figure 32:
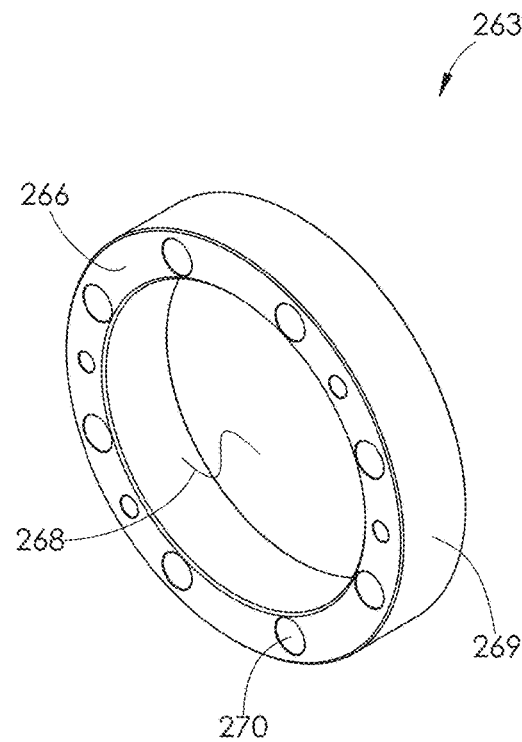
FIG. 32 is a front perspective view of the rear spacer shown in FIG. 31.
Figure 33:
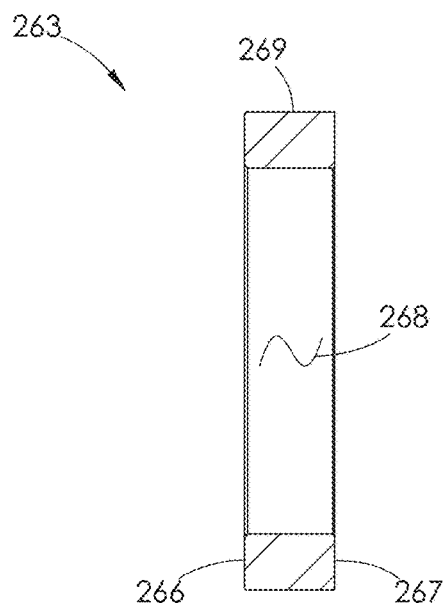
FIG. 33 is a cross-sectional view of the rear spacer shown in FIG. 31, taken along line P-P.
Figure 34:
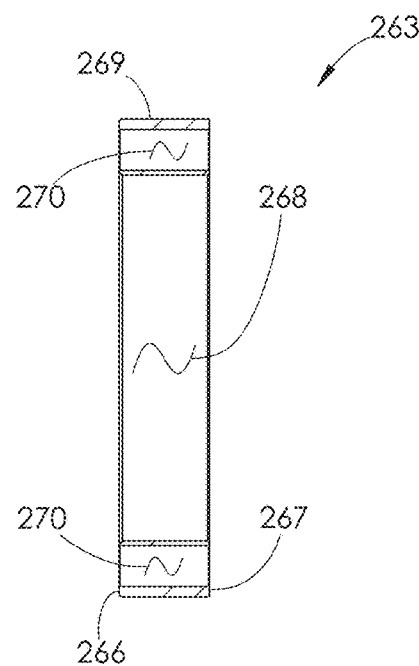
FIG. 34 is a cross-sectional view of the rear spacer shown in FIG. 31, taken along line Q-Q.
Figure 35:
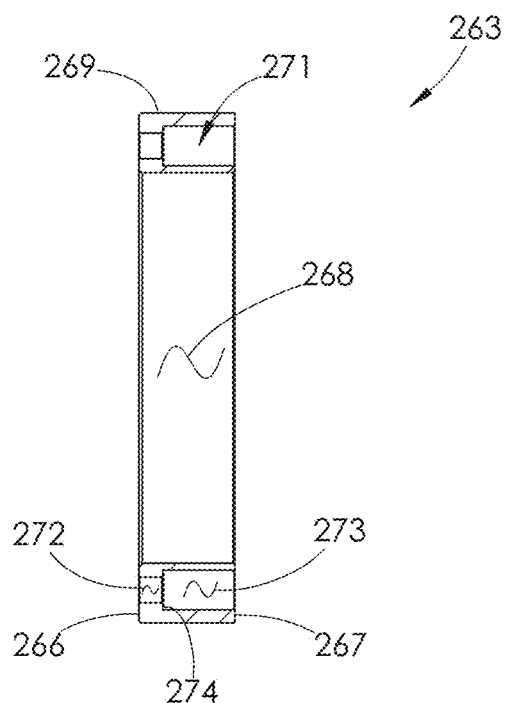
FIG. 35 is a cross-sectional view of the rear spacer shown in FIG. 31, taken along line R-R.
Figure 36:
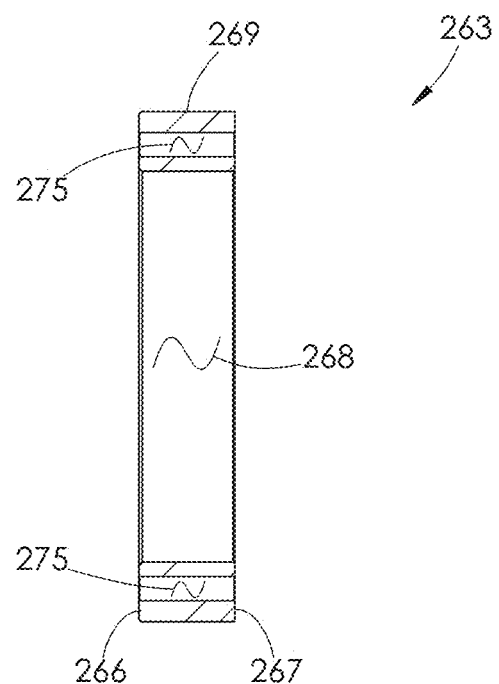
FIG. 36 is a cross-sectional view of the rear spacer shown in FIG. 31, taken along line S-S.
Figure 37:
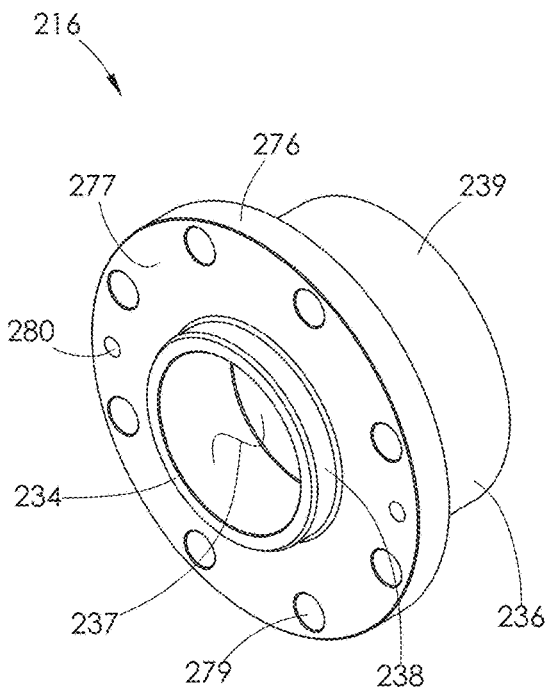
FIG. 37 is a front perspective view of a stuffing box used with the fluid end section shown in FIG. 21.
Figure 38:
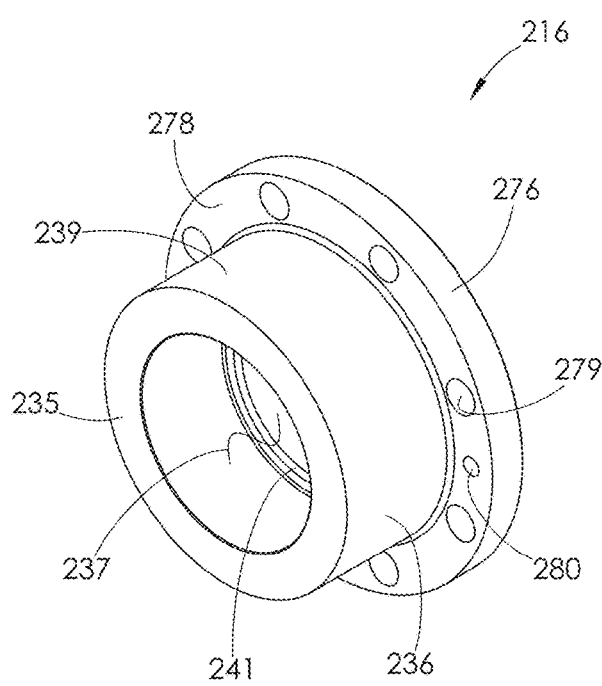
FIG. 38 is a rear perspective view of the stuffing box shown in FIG. 37.
Figure 39:
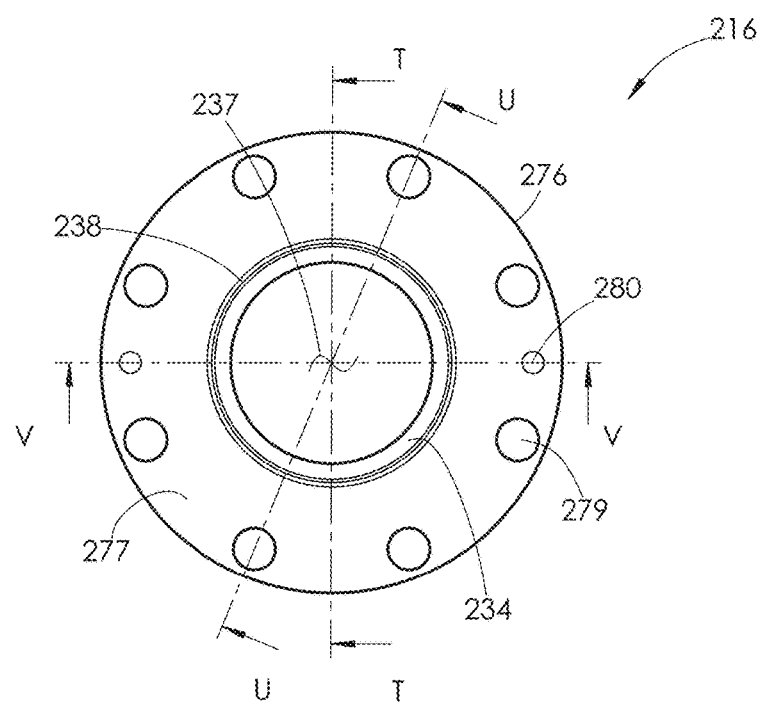
FIG. 39 is a front elevation view of the stuffing box shown in FIG. 37.
Figure 40:
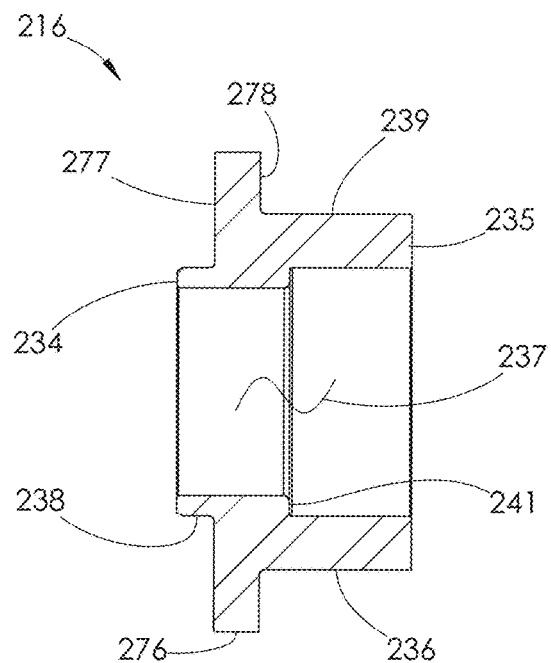
FIG. 40 is a cross-sectional view of the stuffing box shown in FIG. 39, taken along line T-T.
Figure 41:
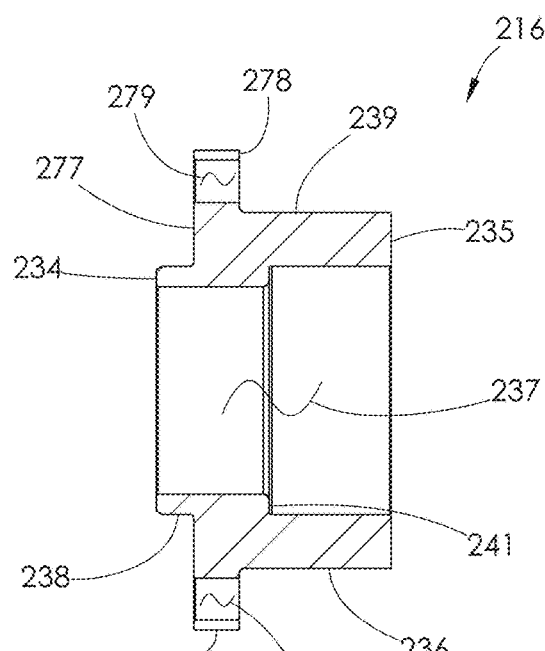
FIG. 41 is a cross-sectional view of the stuffing box shown in FIG. 39, taken along line U-U.
Figure 42:
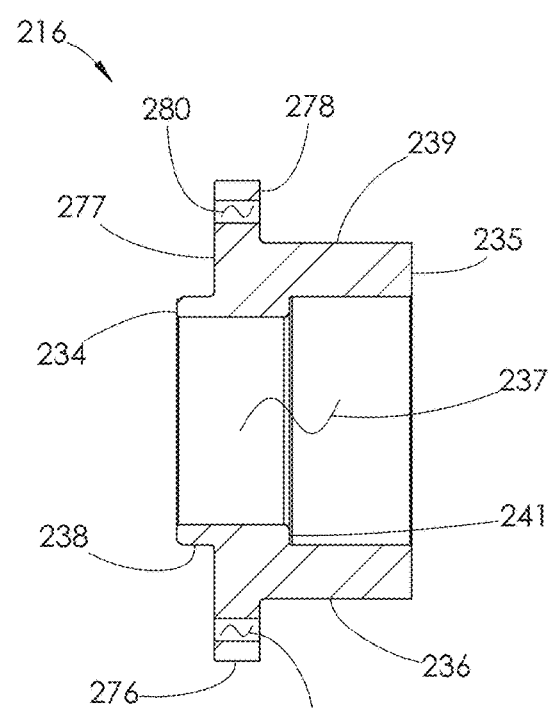
FIG. 42 is a cross-sectional view of the stuffing box shown in FIG. 39, taken along line V-V.
Figure 43:
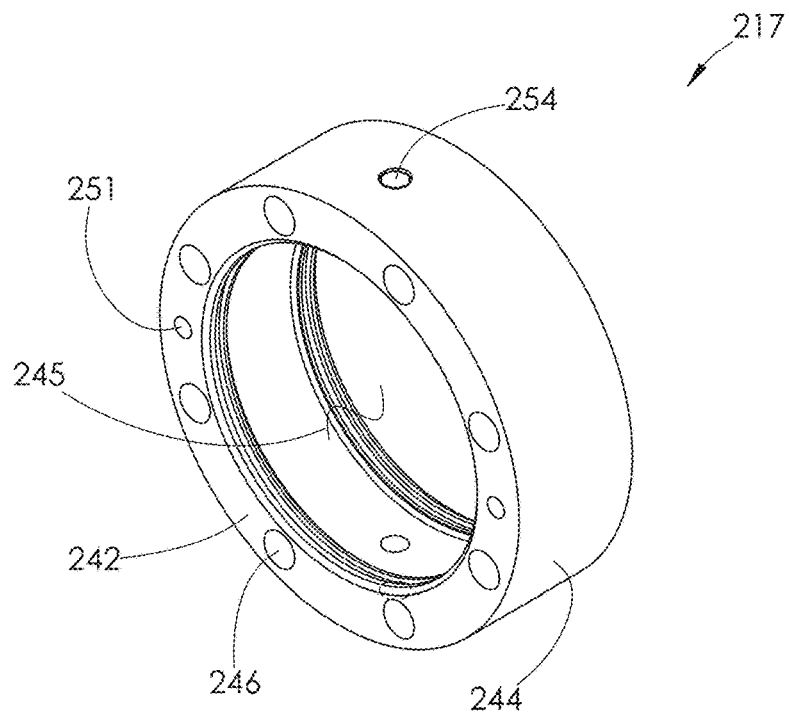
FIG. 43 is a front perspective view of another embodiment of a cooling sleeve used with the fluid end section shown in FIG. 21.
Figure 44:
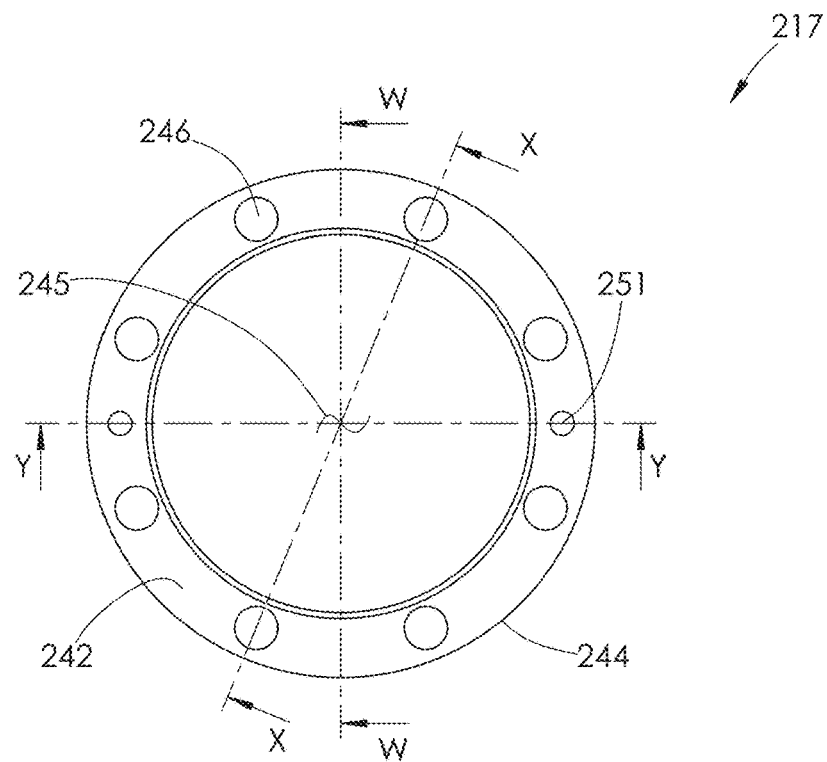
FIG. 44 is a front elevation view of the cooling sleeve shown in FIG. 43.
Figure 45:
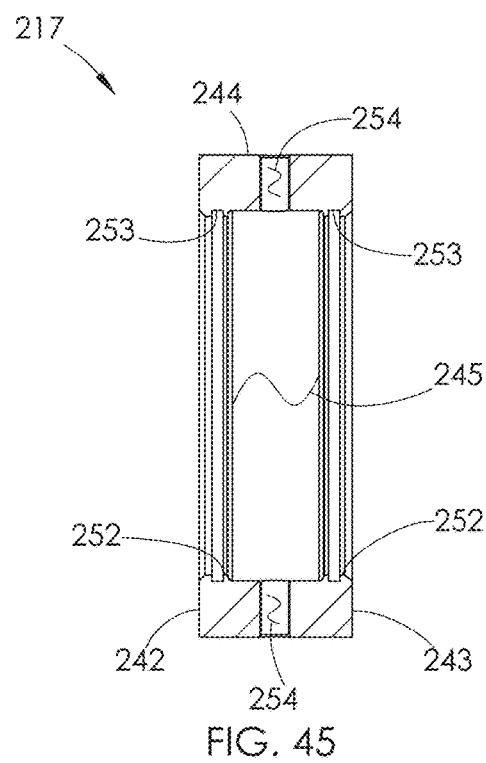
FIG. 45 is a cross-sectional view of the cooling sleeve shown in FIG. 44, taken along line W-W.
Figure 46:
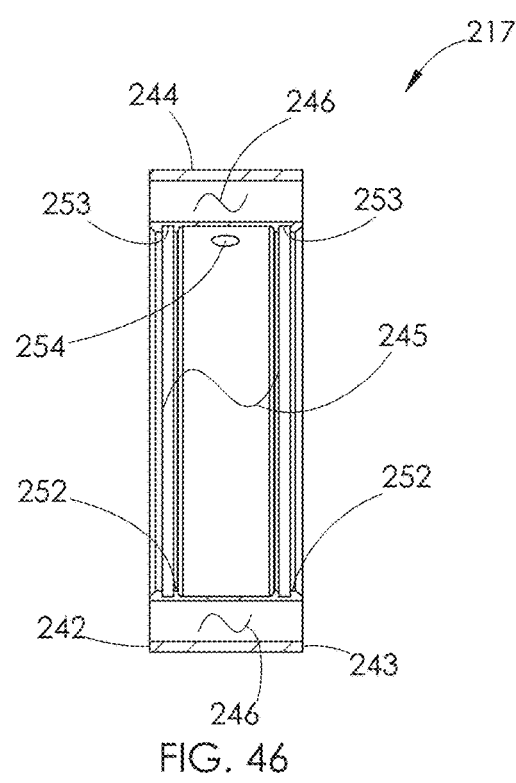
FIG. 46 is a cross-sectional view of the cooling sleeve shown in FIG. 44, taken along line X-X.
Figure 47:
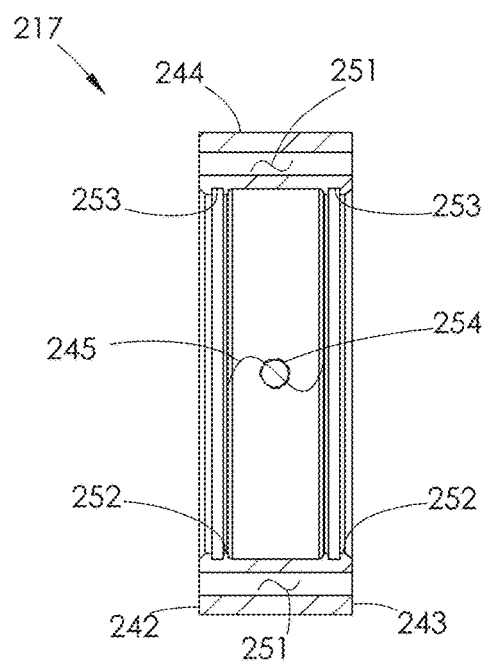
FIG. 47 is a cross-sectional view of the cooling sleeve shown in FIG. 44, taken along line Y-Y.

Second, the dowel passages 275 of the rear spacer sleeve 263 are aligned with the protruding first dowel pins 225. The rear spacer sleeve 263 is then moved toward the rear mounting flange 207 until front surface 266 of the rear spacer sleeve 263 contacts the rear mounting flange 207, as shown in FIG. 28. The protruding portion of the first dowel pins 225 are received by the dowel passages 275 of the rear spacer sleeve 263. The first dowel pins 225 support the rear spacer sleeve 263 until it can be more securely attached by the third fasteners 224.

Figure 27:
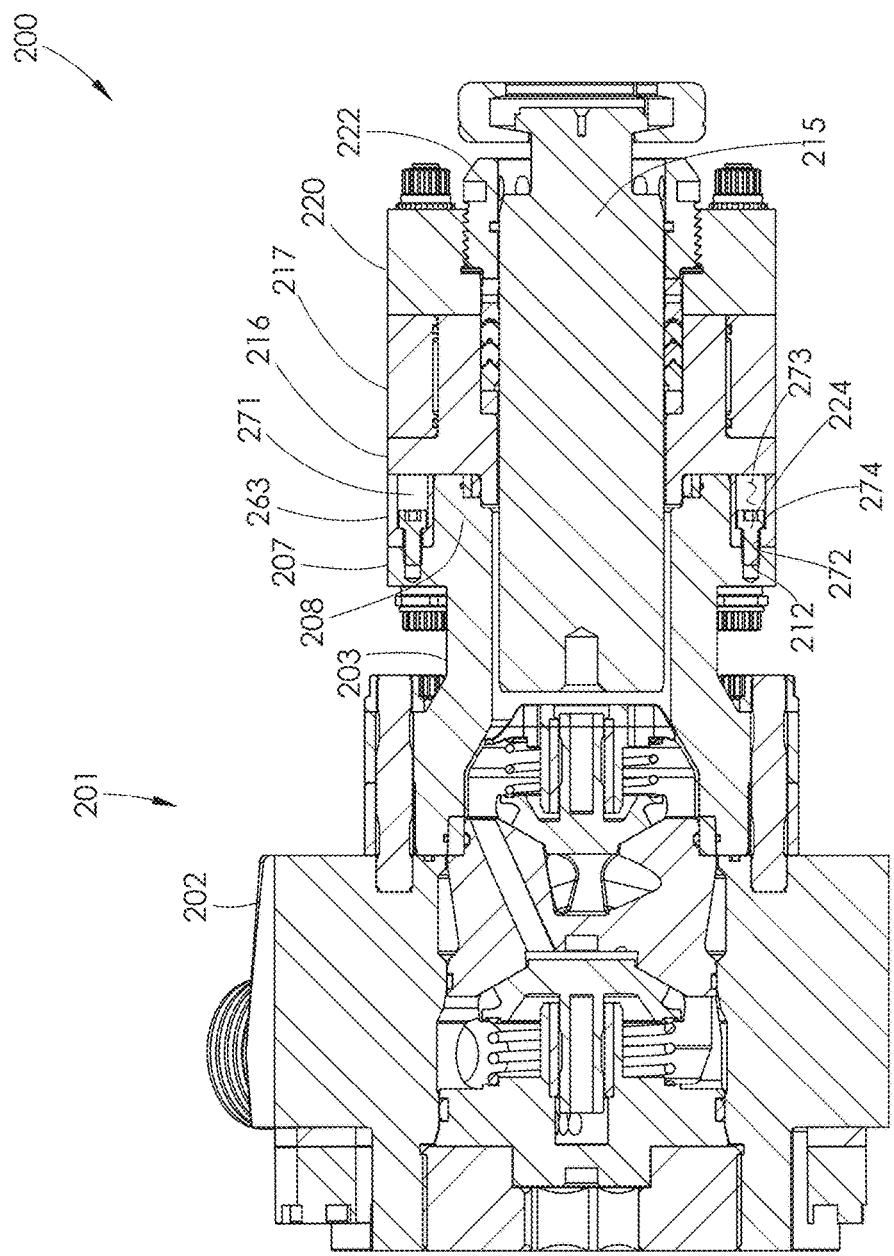
FIG. 27 is a cross-sectional view of the fluid end section shown in FIG. 23, taken along line N-N.

Third, the third fasteners 224 are inserted in the countersink bores 273 of the countersunk passages 271 and torqued into the threaded openings 212 of the rear mounting flange 207 such that the heads of the third fasteners 224 engage the internal shoulder 274 of the countersunk passage 271, as shown in FIG. 27. At this point in the assembly, the rear projecting portion 208 of the second section 203 will be inserted into the central opening 268 of the rear spacer sleeve 263.

Fourth, the second dowel pins 226 are inserted into the dowel passages 275 at the rear surface 267 of the rear spacer sleeve 263 such that approximately half the length of the second dowel pins 226 protrude from the rear surface 267 of the rear spacer sleeve 263, as shown in FIG. 28.

Fifth, the dowel passages 280 of the flange 276 of the stuffing box 216 are aligned with the second dowel pins 226 protruding from the rear surface 267 of the rear spacer sleeve 263. The stuffing box 216 is then moved toward the rear spacer sleeve 263 until the front surface 277 of the flange 276 contacts the rear surface 267 of the rear spacer sleeve. The protruding portion of the second dowel pins 226 are received by the dowel passages 280 of the flange 276, as shown in FIG. 28.

The annular wear ring 204 and annular seal 205 are situated within the second counterbore 213 of the second section 203. The annular wear ring 204 may contact the second section 203 along a base of the second counterbore 213. The annular wear ring 204 may also contact the front surface 277 of the stuffing box's flange 276 at points during operation. A seal is positioned within a wall of the second counterbore 213. Such seal engages the outer surface of the annular wear ring 204, preventing leakage between the annular wear ring 204 and the second counterbore's wall.

The annular wear ring 204 surrounds and engages the annular seal 205, which surrounds and engages the front projecting portion 238 of the stuffing box 216. The annular seal 205 thus prevents leakage between the front projecting portion 238 and the annular wear ring 204. The annular seal 205 may also contact the second section 203 along a portion of the second counterbore 213, and the front surface 277 of the flange 276.

Sixth, the third dowel pins 264 are inserted into the dowel passages 280 at the rear surface 278 of the flange 276 such that approximately half the length of the third dowel pins 264 protrude from the rear surface 278 of the flange 276, as shown in FIG. 28.

Figure 25:
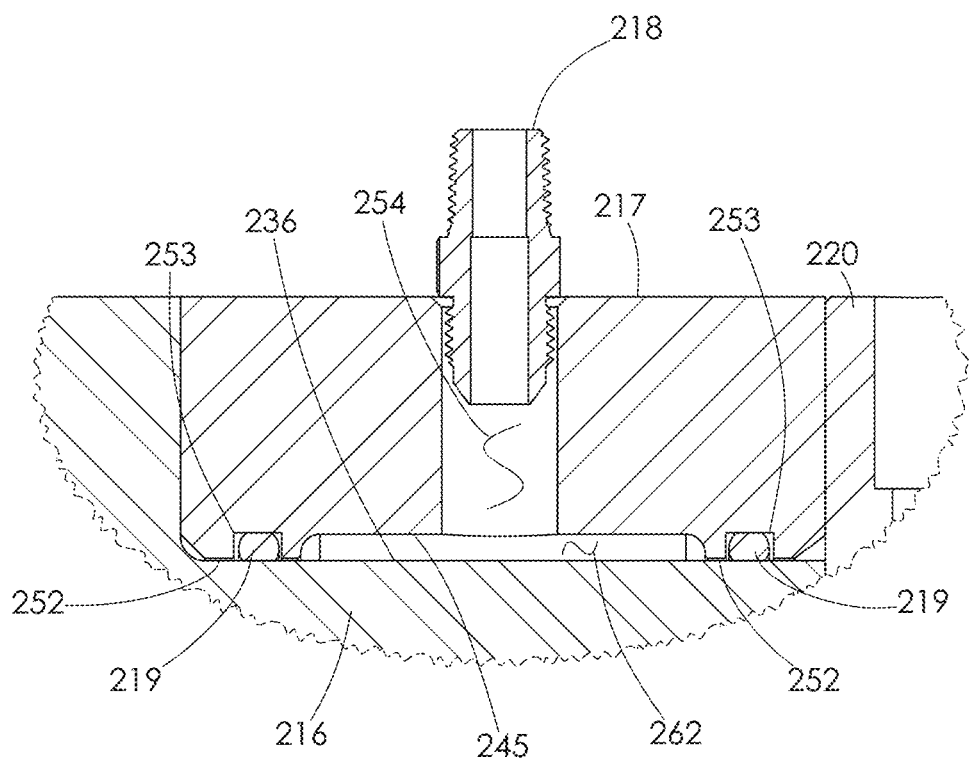
FIG. 25 is an enlarged view of area L of FIG. 24.

Seventh, the coolant seals 219 are inserted into the seal grooves 253 of the reduced diameter sections 252 of the central passage 245 of the cooling sleeve 217, as shown in FIG. 25.

Eighth, the dowel passages 251 of the cooling sleeve 217 are aligned with the third dowel pins 264 protruding from the rear surface 278 of the flange 276. The cooling sleeve 217 is then moved toward the flange 276 until the front surface 242 of the cooling sleeve 217 contacts the rear surface 278 of the flange 276. At this point in the assembly, the coolant seals 219 are in contact with the outer intermediate surface 236 of the stuffing box 216, the annular seal 205 is in contact with the front projecting portion 238 of the stuffing box 216, and the front surface 234 of the stuffing box 216 is in the stuffing box counterbore 214 of the second section 203, as shown in FIG. 28.

Ninth, the fourth dowel pins 265 are inserted into the dowel passages 251 at the rear surface 243 of the cooling sleeve 217 such that approximately half the length of the fourth dowel pins 265 protrude from the rear surface 243 of the cooling sleeve 217, as shown in FIG. 28.

Tenth, referring to FIG. 28, the dowel openings 255 of the rear retainer 220 are aligned with the fourth dowel pins 265 protruding from the rear surface 243 of the cooling sleeve 217. The rear retainer 220 is then moved toward the cooling sleeve 217 until the front surface 256 of the rear retainer 220 contacts the rear surface 243 of the cooling sleeve 217. At this point of the assembly, the second passages 210 of the rear mounting flange 207, the second fastener passages 270 of the rear spacer sleeve 263, the second fastener passages 279 of the flange 276, the second fastener passages 246 of the cooling sleeve 217, and the second fastener passages 257 of the rear retainer 220 are all aligned as shown in FIG. 26.

Figure 26:
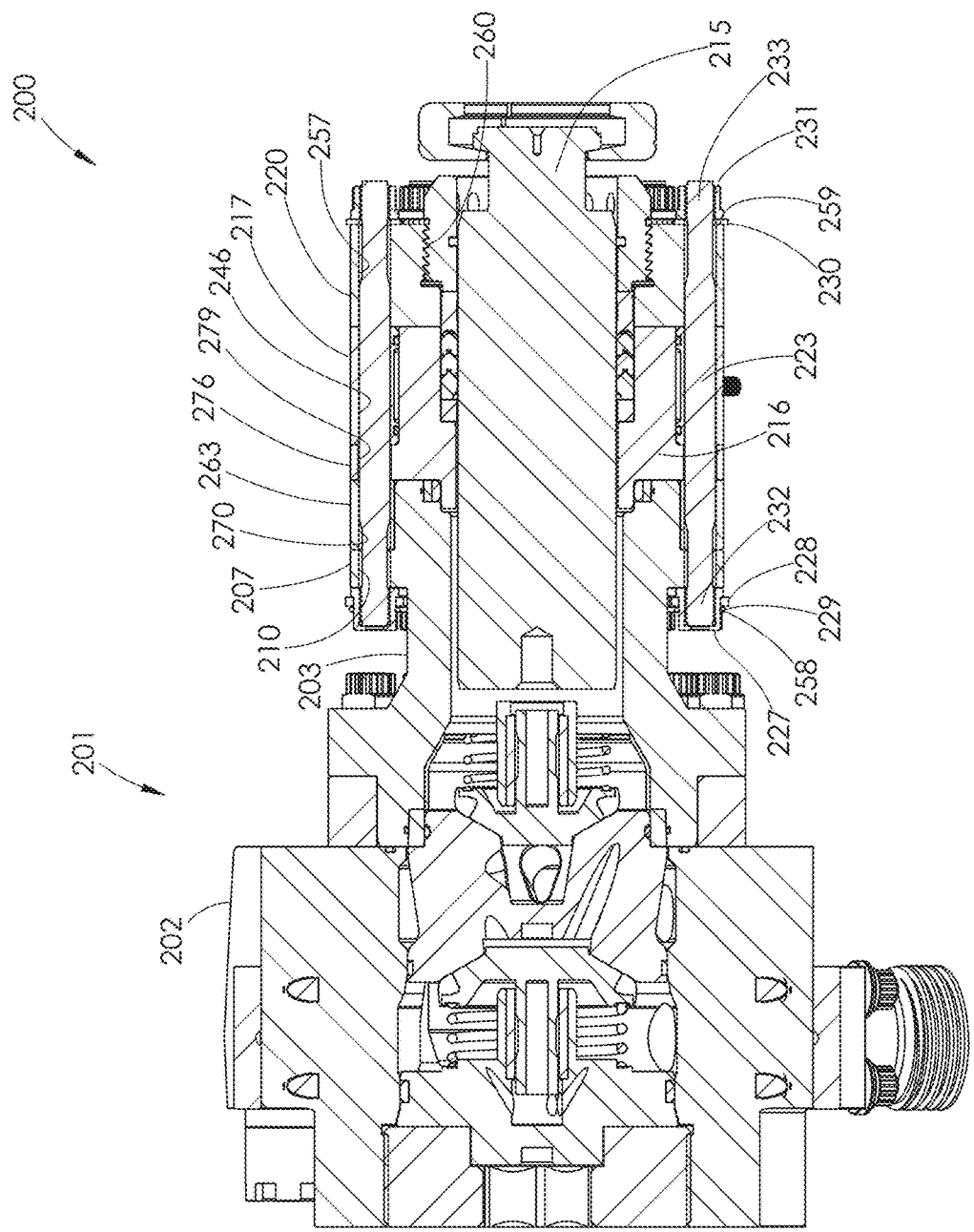
FIG. 26 is a cross-sectional view of the fluid end section shown in FIG. 23, taken along line M-M.

Eleventh, referring to FIG. 26, the first threaded end 232 of a second fastener 223 is inserted into one of the second fastener passages 257 of the rear retainer 220 until the first threaded end 232 protrudes out the rear mounting flange 207. A blind nut 227 is then torqued on the first threaded end 232. A reaction washer is 228 placed over the blind nut 227 and a seal 229 is stretched over the blind nut 227 and seated in the groove 258 of the blind nut 227. The second threaded end 233 is now protruding from the rear surface 259 of the rear retainer 220. A washer 230 is placed over the protruding second threaded end 233, and a nut 231 is threaded onto the second threaded end 233 but not torqued. This step is repeated for each second fastener 223. After all the second fasteners 223 are assembled as described above, full torque is applied to each nut 231 in a manner that assures even clamping forces are applied to the components between the blind nuts 227 and nuts 231.

Twelfth, the plunger packing 221 is inserted into the central passage 237 of the stuffing box 216 and the packing nut 222 is threaded into the internal threads 260 of the rear retainer 220 but not torqued. The plunger 215 is then inserted into the central passage 261 of the packing nut 222 until the front of the plunger 215 extends through the plunger packing 221. The packing nut 222 is then torqued to specification, compressing the plunger packing 221 and providing a seal which prevents high pressure fluid from leaking during operation.

Figure 24:
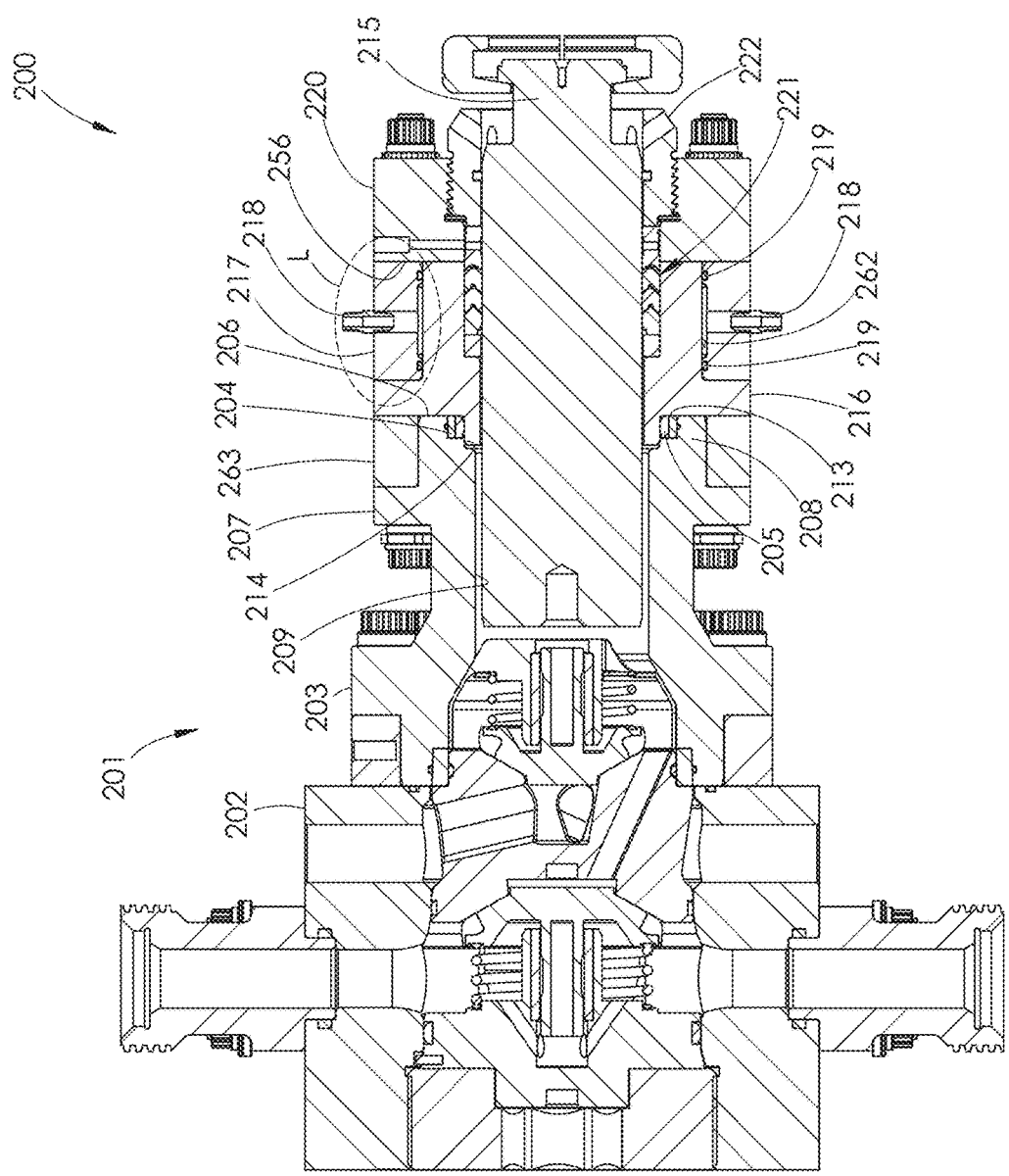
FIG. 24 is a cross-sectional view of the fluid end section shown in FIG. 23, taken along line K-K.

Thirteenth, the coolant fittings 218 are torqued into the threaded fitting passages 254 and a coolant circulation system (not shown) is connected to each coolant fitting 218, as shown in FIG. 24.

Operation of the fluid end section 200 with regards to the pumping of high pressure fluid is as described in the '257 patent.

Referring now to FIGS. 24-25, an annular flow passage 262 is shown. The annular flow passage 262 is the volume bounded by the wall of the central passage 245 of the cooling sleeve 217, the outer intermediate surface 236 of the stuffing box 216, and the reduced diameter sections 252 of the central passage 245 of the cooling sleeve 217.

During operation, a cooling fluid, or coolant, is pumped into one of the coolant fittings 218. The coolant flows in the annular flow passage 262 around the stuffing box 216 and exits the annular flow passage 262 through a second one of the coolant fittings 218. As coolant flows from entry to exit, it absorbs heat generated by the relative movement between the plunger packing 221 and the plunger 215. This heat absorption cools the stuffing box 216, which in turn absorbs heat from the plunger packing 221, thus cooling the plunger packing 221 as well. Reducing the operating temperature of the plunger packing 221 increases the operational life of the plunger packing 221, which also increases the maintenance intervals and reduces operating costs.

Like the first embodiment described herein, the coolant may come from fluid already being delivered to the housing 201 via the suction manifold. For example, the coolant fitting 218 may be interconnected with the suction manifold or another pipe in fluid communication with the suction manifold. Coolant exiting the second coolant fitting 218 may be returned to the fluid supply reservoir.

In alternative embodiments, the coolant may come from a different and separate fluid source not in fluid communication with the suction manifold. Coolant exiting the second coolant fitting 218 in these alternative embodiments may be pumped back into the separate fluid source where it is cooled and recirculated.

In certain embodiments, the flow of coolant within the cooling sleeve 217 may be caused by movement or vibration imparted on the housing 101 by the reciprocating plunger 215. In alternative embodiments, the flow of coolant within the cooling sleeve 217 may be caused by a separate pump system connected to the coolant fittings 218.

Furthermore, the coolant may be the same fluid being pumped by the fluid end, or a derivative of the fluid being pumped by the fluid end. In alternative embodiments, the coolant may be an entirely different fluid from the fluid being pumped by the fluid end.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end, comprising:
    a housing having a rectilinear bore extending therethrough and opposed front and rear surfaces;
    a plunger configured to reciprocate within the housing, at least a portion of the plunger situated within the bore;
    a stuffing box removably attached to the rear surface of the housing, the stuffing box configured to surround at least a portion of the plunger; and
    a cooling sleeve surrounding at least a portion of the stuffing box.

2. The fluid end of claim 1, further comprising:
    a retainer; and
    a plurality of fasteners;
    in which the housing comprises a plurality of first passages formed therein;
    in which the retainer comprises a plurality of second passages formed therein; and
    in which the cooling sleeve comprises a plurality of third passages formed therein;
    wherein the plurality of first passages, the plurality of second passages, and the plurality of third passages are all configured to receive the plurality of fasteners.

3. The fluid end of claim 1, in which the cooling sleeve comprises:
    a central passage formed therein, the central passage comprising:
        a plurality of reduced diameter sections, each reduced diameter section having a seal groove configured to receive a seal.

4. The fluid end of claim 3, further comprising a plurality of coolant fittings, in which the cooling sleeve further comprises:

a first surface;
an opposed second surface;
an outer intermediate surface connecting the first and second surfaces; and
a plurality of passages interconnecting the outer intermediate surface and the central passage;
in which each passage is configured to receive one of the plurality of coolant fittings.

5. The fluid end of claim 1, further comprising a flow passage formed between the cooling sleeve and the stuffing box.

6. The fluid end of claim 5, further comprising a cooling fluid within the flow passage.

7. The fluid end of claim 1, further comprising a plunger packing configured to surround at least a portion of the plunger, in which the plunger packing is situated within the stuffing box.

8. The fluid end of claim 2, further comprising:
a packing nut threaded into the retainer.

9. The fluid end of claim 1, in which the cooling sleeve abuts and engages at least a portion of the housing.

10. The fluid end of claim 1, in which the stuffing box comprises a first section having a first outer diameter, and a second section having a second outer diameter; in which the first outer diameter is greater than the second outer diameter; in which the fluid end further comprises a plunger packing situated within the first section of the stuffing box but not the second section of the stuffing box.

11. The fluid end of claim 1, in which the cooling sleeve comprises a plurality of first passages configured to receive a plurality of fasteners.

12. A fluid end, comprising:
a housing having a bore formed therein;
a stuffing box engaging the housing;
a retainer attached to the housing by a plurality of fasteners;
a plunger configured to reciprocate within the bore;
a cooling sleeve attached to the housing by the plurality of fasteners, the cooling sleeve comprising:
a plurality of first passages configured to receive the plurality of fasteners;
in which the cooling sleeve surrounds the stuffing box; and
a flow passage formed by the stuffing box and the cooling sleeve.

13. The fluid end of claim 12, in which the flow passage receives a cooling fluid.

14. The fluid end of claim 12, in which the cooling sleeve comprises an external surface and a plurality of second passages formed therein; in which each second passage interconnects the external surface and the flow passage.

15. The fluid end of claim 14, in which the cooling sleeve further comprises a plurality of coolant fittings situated within the plurality of second passages.

16. The fluid end of claim 15, in which the coolant fittings and the flow passage receive a cooling fluid.

17. The fluid end of claim 12, further comprising a spacer sleeve situated between a portion of the stuffing box and a portion of the housing.

18. The fluid end of claim 12, further comprising a plunger packing surrounding at least a portion of the plunger and situated within the stuffing box.

19. A fluid end having a rectilinear plunger path, the fluid end comprising:
a body having a bore aligned with the plunger path;
an annular sleeve surrounding the plunger path; in which the sleeve is joined to the body and has an inner surface and an opposed outer surface;
a stuffing box removably attached to the body and having an annular packing section that surrounds the plunger path; in which the packing section is positioned within the sleeve and has an outer surface;
an annular cooling space that surrounds the plunger path; in which the cooling space is closed at each end and is situated between the inner surface of the sleeve and the outer surface of the stuffing box; and
a plunger reciprocable along the plunger path, at least a portion of the plunger situated in the body;
in which a fluid passage joins the inner and outer surfaces of the sleeve at the cooling space.

20. The fluid end of claim 19, in which the fluid passage is a first fluid passage, the fluid end further comprising:
a second fluid passage that joins the inner and outer surfaces of the sleeve at the cooling space.

21. The fluid end of claim 20, in which the second fluid passage is diametrically opposed to the first fluid passage.

22. The fluid end of claim 19, in which the sleeve, the packing section, and the cooling space are concentric.

23. The fluid end of claim 19, in which the packing section is characterized by an inner surface opposed to the outer surface, and further comprising:
an annular packing recess that surrounds the plunger path; in which the packing recess is open at at least one end and is bounded by the inner surface of the packing section.

24. The fluid end of claim 23, in which a packing material is received within the packing recess.

25. The fluid end of claim 19, in which the annular sleeve comprises a plurality of first passages configured to receive a plurality of fasteners.

26. A fluid end, comprising:
a housing having a bore formed therein;
a stuffing box engaging the housing;
a retainer attached to the housing by a plurality of fasteners;
a plunger configured to reciprocate within the bore;
a cooling sleeve attached to the housing by the plurality of fasteners, the cooling sleeve comprising:
a plurality of countersunk passages formed therein, the plurality of countersunk passages configured to receive a plurality of second fasteners; in which the plurality of second fasteners are configured to thread into the housing;
in which the cooling sleeve surrounds the stuffing box; and
a flow passage formed by the stuffing box and the cooling sleeve.

27. A fluid end, comprising:
a housing having a bore formed therein;
a stuffing box engaging the housing;
a retainer attached to the housing by a plurality of fasteners;
a plunger configured to reciprocate within the bore;
a cooling sleeve attached to the housing by the plurality of fasteners, the cooling sleeve comprising:
a plurality of dowel passages configured to receive a plurality of dowel pins;
in which the cooling sleeve surrounds the stuffing box; and
a flow passage formed by the stuffing box and the cooling sleeve.

28. The fluid end of claim 27, in which the plurality of dowel pins are configured to extend into the housing.

29. A fluid end, comprising:
   a housing having a bore formed therein;
   a stuffing box engaging the housing;
   a retainer attached to the housing by a plurality of fasteners;
   a plunger configured to reciprocate within the bore;
   a cooling sleeve attached to the housing by the plurality of fasteners; in which the cooling sleeve surrounds the stuffing box;
   a flow passage formed by the stuffing box and the cooling sleeve; and
   an annular wear ring situated within the housing and surrounding at least a portion of the stuffing box.

* * * * *

UNITED STATES PATENT AND TRADEMARK OFFICE
CERTIFICATE OF CORRECTION

PATENT NO. : 12,404,857 B2
APPLICATION NO. : 18/960118
DATED : September 2, 2025
INVENTOR(S) : Thomas et al.

Page 1 of 1

It is certified that error appears in the above-identified patent and that said Letters Patent is hereby corrected as shown below:

In the Specification

Column 5, Line 64, before the word "front", please insert --the--.
Column 7, Line 11, please delete "is 128" and substitute therefor "128 is".
Column 9, Line 59, before the word "front", please insert --the--.

Signed and Sealed this
Thirtieth Day of September, 2025

John A. Squires
*Director of the United States Patent and Trademark Office*